United States Patent [19]

Vreeswijk et al.

[11] Patent Number: 5,043,810
[45] Date of Patent: Aug. 27, 1991

[54] METHOD AND APPARATUS FOR TEMPORALLY AND SPATIALLY PROCESSING A VIDEO SIGNAL

[75] Inventors: Franciscus W. P. Vreeswijk; Jan Van Der Meer; Henk W. A. Begas, all of Eindhoven, Netherlands; Timothy I. P. Trew, Horley, England

[73] Assignee: U.S. Philips Corporation, New York, N.Y.

[21] Appl. No.: 288,058

[22] Filed: Dec. 20, 1988

Related U.S. Application Data

[63] Continuation-in-part of Ser. No. 281,294, Dec. 7, 1988, Pat. No. 4,965,687.

[30] Foreign Application Priority Data

Dec. 22, 1987 [GB] United Kingdom ............... 8729878
Feb. 23, 1988 [NL] Netherlands ..................... 8800449

[51] Int. Cl.⁵ ............... H04N 7/12; H04N 7/04; H04N 11/06
[52] U.S. Cl. .................. 358/133; 358/141; 358/12
[58] Field of Search ............ 358/310, 330, 141, 133, 358/105, 140, 141, 11, 12

[56] References Cited

U.S. PATENT DOCUMENTS

| | | | |
|---|---|---|---|
| 4,765,458 | 5/1988 | Hirano et al. | 358/105 |
| 4,785,348 | 11/1988 | Fonsalas et al. | 358/133 |
| 4,941,045 | 7/1990 | Birch | 358/105 |
| 4,963,965 | 10/1990 | Haghiri et al. | 358/105 |
| 4,972,259 | 11/1990 | Motoe et al. | 358/105 |
| 4,982,280 | 1/1991 | Lyon et al. | 358/105 |

Primary Examiner—John K. Peng
Attorney, Agent, or Firm—Michael E. Marion

[57] ABSTRACT

A transmitting section of the system according to the invention has transmitting section signal paths for at least three classes of motion, each with a preprocessing circuit (143, 145 and 147) which are provided with means for individually sampling. These sampling means sample in accordance with separate sampling patterns so that each preprocessing circuit (143, 145 or 147) supplies a video signal which is suitable for a display with an optimum distribution of temporal and/or spatial resolution for the associated class of motion. Dependent on the class of motion determined, one of the preprocessing circuits (143, 145 or 147) is coupled to a channel (170). The video signal to be supplied to the channel (170) is therefore a video signal suitable for a display with an optimum distribution of temporal and/or spatial resolution for the given class of motion (FIG. 1A). A high-definition receiving section of the system according to the invention also has at least three receiving section signal paths comprising a postprocessing circuit (43, 45 and 47) which decodes a received video signl in accordance with a method associated with the relevant postprocessing circuit (43, 45 or 47). The correct postprocessing circuit (43, 45 or 47) is selected in accordance with the class of motion, so that in the receiving section of the system according to the invention a display with an increasing spatial resolution can be achieved in the case of a decreasing motion (FIG. 1B).

19 Claims, 15 Drawing Sheets

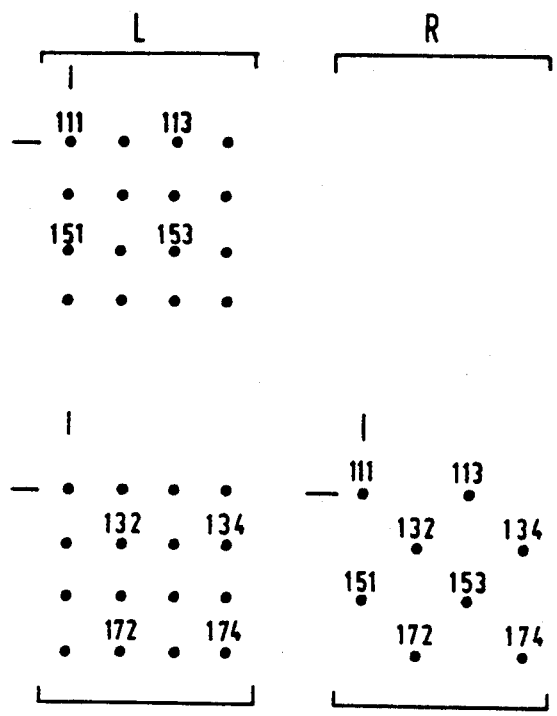
FIG.4B1
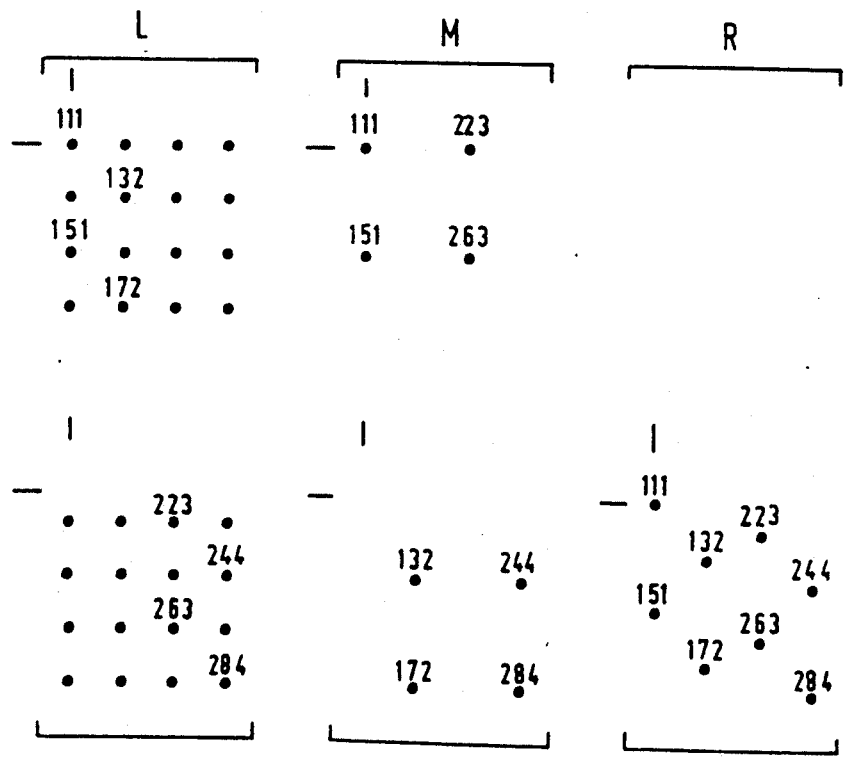
FIG.4B2

METHOD AND APPARATUS FOR TEMPORALLY AND SPATIALLY PROCESSING A VIDEO SIGNAL

This application is a continuation-in-part of U.S. Ser. No. 281,294 filed Dec. 7, 1988, U.S. Pat. No. 4,965,667 which is incorporated by reference herein.

BACKGROUND OF THE INVENTION

The invention relates to a method of transmitting or recording a television signal by way of a transmission or recording channel, the television signal comprising a video signal, said method comprising creating a television signal to be supplied to the channel in accordance with a plurality of possible operations on the video signal providing mutually different distributions of spatial and/or temporal resolution, and a selection of one operation on the video signal from the plurality of possible operations on the video signal.

The invention also relates to a recording medium on which a television signal has been recorded, said television signal including a video signal having been processed by the recording method.

The invention also relates to apparatus for processing the video signal of a television signal prior to its application to a transmission or recording channel, said apparatus comprising video signal input means, a plurality of video signal processing paths providing mutually different distributions of spatial and/or temporal resolution, and a decision circuit having an output coupled to a control signal input of the transmitting section.

The invention further relates to apparatus for receiving a television signal including a video signal and being conveyed over a transmission or recording channel, said apparatus comprising means for processing a video signal in accordance with a plurality of possible operations on said received video signal providing mutually different distributions of spatial and/or temporal resolution, each operation corresponding to a respective one of different sampling patterns in accordance with which the received video signal could have been sampled before said conveyance.

The invention also relates to means for processing a video signal for use with the receiving apparatus.

Such a video signal processing apparatus and such a receiving apparatus are known from the article "Analyse de structures de sous-echantillonnage spatio-temporel d'un signal TVHD en vue de sa transmission dans un canal MAC", presented on the TVHD'87, Ottawa (CA), 4–8 Oct. 1987, vol. 1, p. 6.2.2.–6.2.28, in which three video signal processing paths and three possible operations on said received video signal are shown.

SUMMARY OF THE INVENTION

It is an object of the invention to provide an improved transmitting or recording method, an improved video signal processing apparatus and an improved receiving apparatus.

According to the invention, a transmitting or recording method as described in the opening paragraph is therefore characterized in that said selection includes spatial and/or temporal consistency control of a selection relating to a part of an image compared to selections relating to spatially and/or temporally neighbouring parts of the image.

According to the invention, a video signal processing apparatus as described in the opening paragraph is therefore characterized in that said decision circuit includes means for a spatial and/or temporal consistency control of a decision relating to a part of an image compared to decisions relating to spatially and/or temporally neighbouring parts of the image.

According to the invention, a receiving apparatus as described in the opening paragraph is therefore characterized in that the respective operations include converting a sampling pattern of a block of pixels which is sampled in accordance with a sampling pattern not corresponding to that operation and which block adjoins a block which is sampled with a sampling pattern corresponding to that operation, to said corresponding sampling pattern.

The invention is based on the recognition that in the video signal processing apparatus and in the transmitting/recording method, decisions/selections, which might be correct if taken alone, will lead to disorderly results if taken together. The invention is also based on the recognition that in the operation providing the highest resolution the use of information from each supplied field would result in motion blur in the case of small movements. The invention is further based on the recognition that in the receiving apparatus the juxtaposition of blocks being sampled according to different sampling patterns will lead to interpolation problems.

In order to provide temporal consistency, said consistency control may include field rate control for selecting one route out of a plurality of allowed routes of time-sequential pictures or parts of pictures through said plurality of possible operations on the video signal on the basis of said selections.

In order to provide consistency between said routes, said consistency control may further include consistency control between routes of spatially neighbouring parts of the image and/or between time-sequential routes.

Where the source of the television signal includes films, the method may include a film mode in which the operation providing the highest temporal resolution is not used.

Said selection may include arranging the motion in a plurality of classes, the number of classes also being equal to the number of possible operations on the video signal.

Said selection may further include supplying a first and a second signal indicating whether the magnitude of the motion is larger than a first and a second threshold, respectively, and arranging the magnitude of the motion in three classes on the basis of said first and second signals.

The operation providing a medium resolution may include motion estimation for determining motion vectors for video signals between displaced fields, so that a higher spatial resolution than is associated with the magnitude of the motion can be achieved in the receiver by using motion compensated interpolation. Additionally, the operation providing the highest resolution may include motion estimation for determining motion vectors for video signals between displaced fields.

In a corresponding receiving apparatus, the operation providing a medium spatial resolution may include motion compensated interpolation. Additionally, the operation providing the highest spatial resolution may include motion compensated interpolation. Said processing means may therefore include motion compensated interpolation means being provided with switchable delay means and averaging means.

BRIEF DESCRIPTION OF THE DRAWINGS

The invention will now be described in greater detail, by way of non-limiting example, with reference to the accompanying drawings in which FIGS. 5A, 5B1, 5B2 and 5C illustrate the frequency responses of anti-alias filters in the preprocessing circuits of FIGS. 3A, 3B1, 3B2 and 3C.

DETAILED DESCRIPTION OF THE INVENTION

Figure 1A:
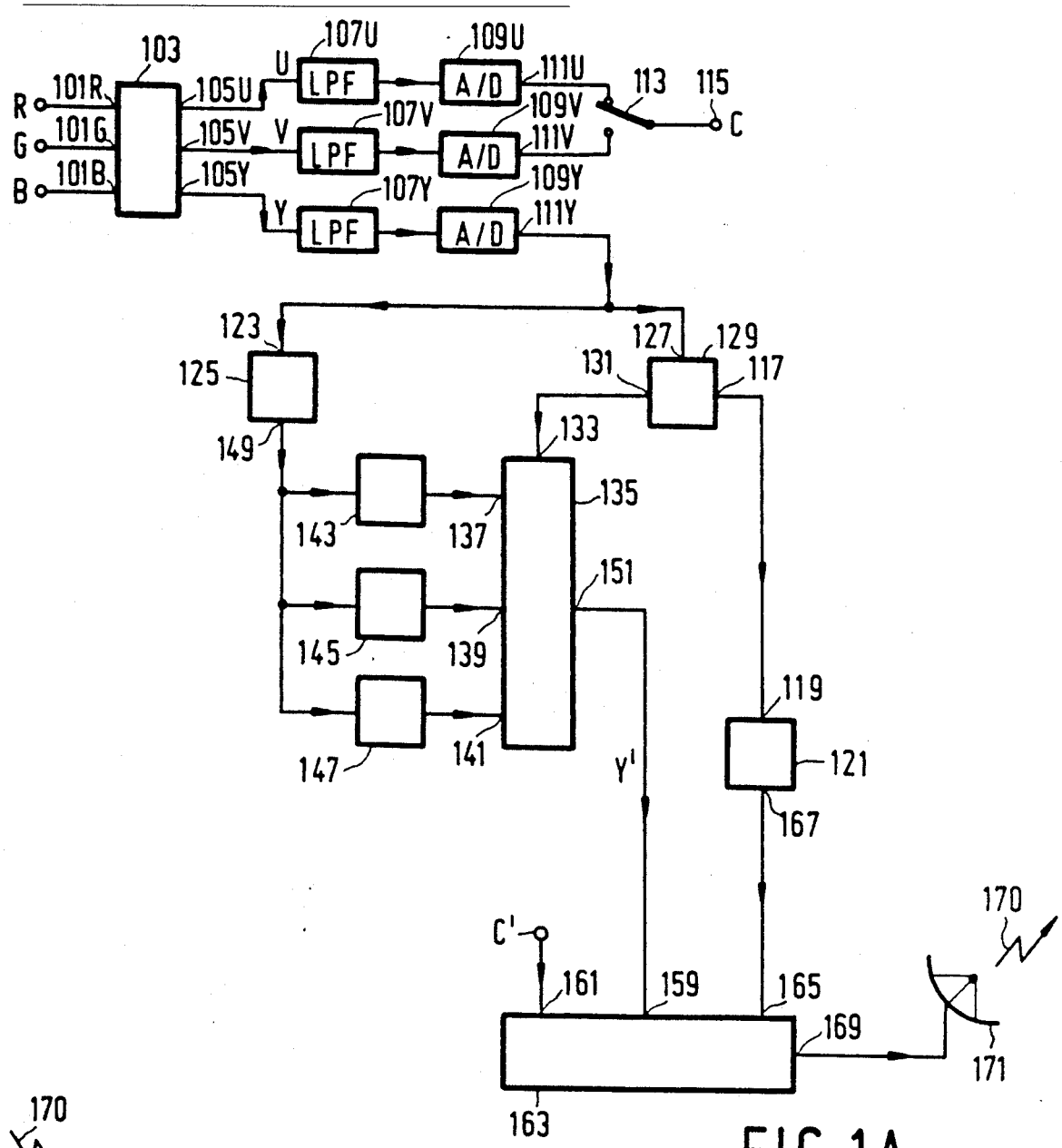
FIG. 1A is a block diagram of a transmitting section suitable for the system according to the invention.

In FIG. 1A a wideband video signal from a high definition camera is applied to R, G and B inputs of a transmitting section. The high definition video signal has, for example, a line number and a number of picture elements which can be distinguished for each line which are both twice as high as the line number and the number of picture elements which can be distinguished for each line in a normal definition signal, for example, a MAC video signal. MAC is an abbreviation of "Multiplexed Analog Components"; in a MAC television transmission system analog luminance and chrominance signals are transmitted in time-division multiplex. To transmit the line number and the number of picture elements which can be distinguished for each line in the high definition video signal over a relatively narrow band channel which is suitable for a normal definition MAC video signal, the high definition signal in the transmitting section must undergo a number of operations to be described hereinafter. The R, G and B inputs of the transmitting section are connected to inputs 101R, 101G and 101B, respectively, of an RGB-to-YUV converter 103, outputs 105U, 105V and 105Y of which are connected via low-pass filters (LPF) 107U, 107V and 107Y to analog-to-digital (A/D) converters 109U, 109V and 109Y, respectively. Output signals at an output 111U of the A/D converter 109U and at an output 111V of the A/D converter 109V are combined by means of a switch 113 to a chrominance signal C at a terminal 115. An output 111Y of the A/D converter 109Y is connected to an input 123 of a memory 125 and to an input 127 of a motion processing circuit 129. The memory 125 compensates for a delay of the signal in the motion processing circuit 129. An output 131 of the motion processing circuit 129 is connected to a control input 133 of a change-over switch 135, three video signal inputs 137, 139 and 141 of which are connected via three branches comprising preprocessing circuits 143, 145 and 147, respectively, to an output 149 of the memory 125. An output 151 of the change-over switch 135 supplies a processed luminance signal Y' and is connected to a first input 159 of a MAC encoding circuit 163. A nyquist filter may be placed between the output 151 of the change-over switch 135 and the input 159 of the MAC encoding circuit 163 as shown in U.S. Pat. No. 4,965,667. A processed chrominance signal C' is applied to a second input 161 of the MAC encoding circuit 163. This processed chrominance signal C' may be obtained from the chrominance signal C in a manner which is, for example, identical to the manner in which the processed luminance signal Y' is obtained from the luminance signal Y. Based on the recognition that the chrominance signal C is not suitable anyway for a display with a spatial resolution which is equally high as that for which the luminance signal Y is suitable, it is alternatively possible to use only two signal paths for the processing operations on the chrominance signal C so that a less complex realization of the chrominance signal processing circuits may suffice. A data output 117 of the motion processing circuit 129 is connected to an input 119 of a bit rate reduction circuit 121, an output 167 of which is connected to a data input 165 of the MAC encoding circuit 163. The data signal which is presented to the data input 165 of the MAC encoding circuit 163 is also referred to as the DATV signal. DATV is an abbreviation of "Digitally Assisted Tele-Vision" which means that not only the video signal but also an auxiliary signal (the DATV signal) is transmitted, with which the high definition receiving section decodes and processes the received television signal. The MAC encoding circuit 163 performs a number of known operations in order to encode the television signal in conformity with a selected MAC television transmission standard and to transmit it via a channel. In this respect it is to be noted that the television signal to be supplied by the transmitting section of the system can be displayed by a conventional MAC receiver, and is thus compatible with a normal definition television signal in accordance with the selected MAC television transmission standard, but has nevertheless a wider band than this normal definition television signal. An output 169 of the MAC encoding circuit 163 applies a television signal to be transmitted to a channel 170 for which purpose a dish antenna 171 is shown symbolically. Of course channels other than a satelite channel are alternatively possible; the system according to the invention may be used alternatively, for example, as a recording and display system in which the channel is a recording medium.

Figure 5A:
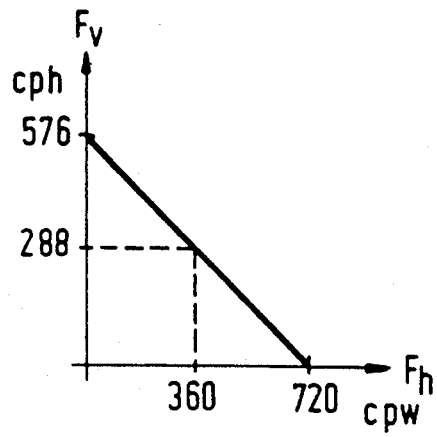

The transmitting section operates as follows. Dependent on an amount of motion to be determined by means of the motion processing circuit 129 in a high definition video signal applied to the R, G and B inputs of the transmitting section, which motion is classified as (substantially) no, little or considerable motion, the change-over switch 135 selects that preprocessing circuit 143, 145 or 147 which is to be coupled to the channel 170. The preprocessing circuit 143 is adapted to preprocess a high definition video signal with (substantially) no motion, with the input 137 of the change-over switch 135 receiving a high resolution video signal which is suitable for a display with a maximum possible spatial resolution but with a small temporal resolution. Temporal resolution is herein understood to mean the number of motion phases per unit of time. Since the transmitted spatial resolution of the high resolution video signal, as denoted by a solid line in FIG. 5A, is twice as large as that of a stationary normal definition video signal, for example, a MAC signal, as shown in FIG. 5A by means of a broken line, it follows that the temporal resolution must be twice as low. Temporal resolution is, however, of no importance in the case of still pictures and of lesser importance in pictures exhibiting little motion. As in FIGS. 5B1, 5B2 and 5C, FIG. 5A shows vertical frequencies Fv expressed in cph (cycles per picture height) which are plotted vertically, and horizontal frequencies Fh expressed in cpw (cycles per picture width) which are plotted horizontally. In other words, the spatial resolution of this high resolution video signal transmitted in the case of (substantially) no motion is thus four times as high and the temporal resolution is thus four times as low as that of a field of a normal definition video signal.

Figure 5C:
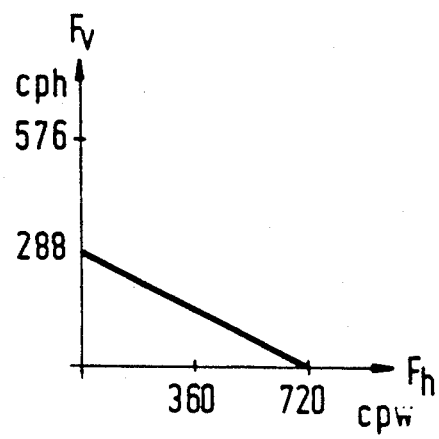
Figure 5C:
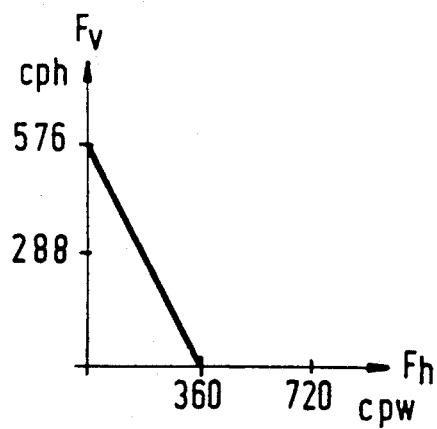
Figure 5C:
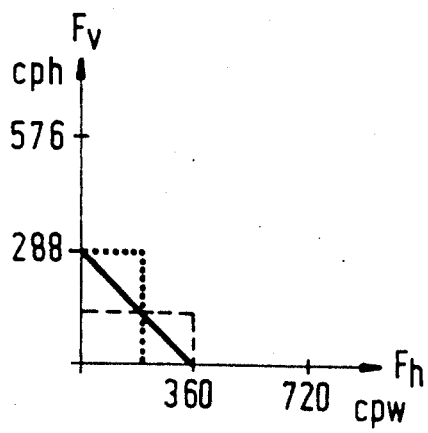

In contrast to this, the preprocessing circuit 147 is adapted to preprocess a high definition video signal having a considerable motion, with the input 141 of the change-over switch 135 receiving a low resolution video signal is which is suitable for a display with a temporal resolution which is equal to that of a field of the normal definition video signal, which results in that the spatial resolution can also be compared with that of a field of the normal definition video signal because the signal to be transmitted is transmitted via a MAC channel which is indicated by a solid line in FIG. 5C: hence, with much motion, the higher spatial resolution which the high definition video signal can offer cannot be utilized. Use is made of the fact that a viewer is less sensitive to shortcomings in the spatial resolution in the picture in the case of fast motions, so that there arises room for a larger temporal resolution with a simultaneous decrease of the spatial resolution. It will be evident that in view of the limited bandwidth of the channel it is not possible to transmit a video signal suitable for a display with a large temporal and simultaneously a large spatial resolution. Dependent on the amount of motion in the pictures to be displayed by means of the video signal it is possible to transmit a video signal suitable for the display with the combination of spatial and temporal resolution which is most favourable to the viewer. The video signal transmitted in the case of considerable motion will hereinafter be referred to as the low resolution video signal.

Between these two extremes there is the video signal applied by the preprocessing circuit 145 to the input 139 of the change-over switch 135. The spatial resolution is twice as high and the temporal resolution is (consequently) twice as low as in a field of a normal definition video signal. In other words, the spatial and temporal resolutions are equal to those of a picture of a stationary normal definition video signal. In one embodiment of the invention it is possible to choose, dependent on the spatial frequencies, whether the horizontal or the vertical resolution of the transmitted medium resolution video signal will be twice as high as that of a field of the normal definition video signal. See also FIGS. 5B1 and 5B2. This video signal transmitted in the case of little motion will hereinafter be referred to as the medium resolution video signal.

In summary, signals suitable for a display with a mutually different distribution of spatial and/or temporal resolution are presented to the signal inputs of the change-over switch 135.

In an embodiment of the system according to the invention the motion processing circuit 129 includes a motion estimator determining the direction, magnitude and uniformity of the motion. As has been stated, the spatial resolution of the video signal transmitted by the system decreases with an increasing magnitude of the motion. In the case of a uniform motion a display with a higher spatial resolution than is associated with the magnitude of the motion can be achieved in the receiving section by using motion-compensated interpolation. The motion vector required for this purpose is then to be determined by the transmitting section and is to be transmitted as auxiliary information in the DATV signal. The motion processing circuit may make a distinction between, for example, (substantially) no motion (for example, less than 0.5 pixel per picture period), little motion (for example, more than 0.5 but fewer than 1.5 pixels per picture period), considerable motion (for example, more than 1.5 but fewer than 6 pixels per picture period) and very considerable motion (for example, more than 6 pixels per picture period). In the case of (substantially) no motion the high resolution preprocessing circuit 143 is activated. In the case of little and uniform motion the high resolution preprocessing circuit 143 is activated and in the case of little and non-uniform motion the medium resolution preprocessing circuit 145 is activated. In the case of considerable and uniform motion the medium resolution preprocessing circuit 145 or possibly even the high resolution preprocessing circuit 143 is activated and in the case of considerable and non-uniform movement the low-resolution preprocessing circuit 147 is activated. In the case of very considerable motion the low resolution preprocessing circuit 147 is activated, independently of the uniformity of the motion.

In another embodiment of the system according to the invention the system has a film mode in which the low resolution preprocessing circuit 147 is not activated. This embodiment is based on the recognition that the temporal resolution of film images is only equal to 24 motion phases per second (in which the light beam is interrupted once during imaging of a film image in order to prevent troublesome flicker effects) so that it makes little sense to transmit these film images at a temporal resolution of 50 fields per second. Since the temporal resolution of film images is relatively low, a higher spatial resolution can be emphasized. In this film mode the motion processing circuit 129 thus selects either the high resolution preprocessing circuit 143 or the medium resolution preprocessing circuit 145, dependent on the extent of motion.

Figure 1B:
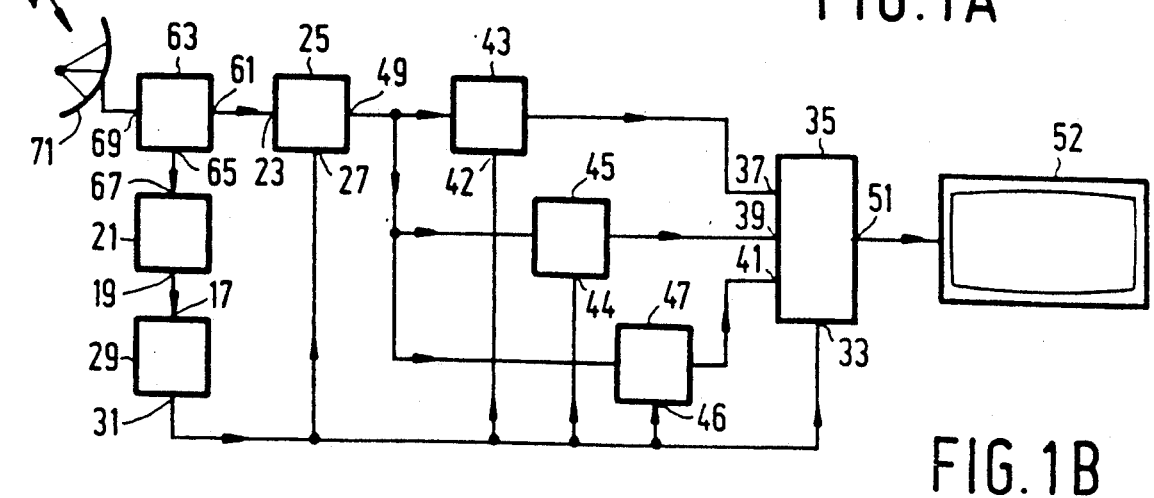
FIG. 1B is a block diagram of a receiving section suitable for the system according to the invention.

FIG. 1B shows a receiving section suitable for the system according to the invention. It will be evident that the possibilities provided by the circuits incorporated in the transmitting section can be used advantageously if the receiving section has complementary circuits cooperating with the circuits incorporated in the transmitting section. A dish antenna 71 receives the MAC-compatible television signal which is transmitted via the channel 170 and is connected to an input 69 of a MAC decoding circuit 63 which supplies a video signal at a video output 61 and a DATV signal at a DATV output 65. The MAC decoding circuit 63 performs various known operations which are required for receiving and decoding, in accordance with the selected MAC television transmission standard, the MAC-compatible television signal supplied by the transmitting section of the system. The DATV output 65 of the MAC decoding circuit 63 is connected to an input 67 of a bit rate restoring circuit 21 which performs the inverse operation of the operation performed by the bit rate reducing circuit 121 in the transmitting section of FIG. 1A. An output 19 of the bit rate restoring circuit 21 is connected to an input 17 of a DATV decoding circuit 29 which decodes the DATV signal and generates control signals therefrom which are supplied at an output 31 of the DATV decoding circuit 29. The output 31 of the DATV decoding circuit 29 is connected to a control input 27 of an intermediate processing circuit 25, to a control input 42 of a high resolution postprocessing circuit 43, to a control input 44 of a medium resolution postprocessing circuit 45, to a control input 46 of a low resolution postprocessing circuit 47 and to a control input 33 of a change-over switch 35. The intermediate processing circuit 25 performs a number of operations which are common for video signals suitable for a display with a high, a medium and a low resolution. The postprocessing circuits 43, 45 and 47 perform the inverse operations of the operations performed by the preprocessing circuits 143, 145 and 147, respectively, in the transmitting section of FIG. 1A. The video output 61 of the MAC decoding circuit 63 is connected to an input 23 of the intermediate processing circuit 25 an output 49 of which is connected via the postprocessing circuits 43, 45 and 47 to inputs 37, 39 and 41, respectively, of the change-over switch 35, an output 51 of which is connected to a display device 52.

In summary, the transmitting section of the system according to the invention has transmitting section signal paths for at least three classes of motion, each path comprising means for invidually sampling. These sampling means sample in accordance with separate sampling patterns so that each signal path supplies a signal which is suitable for a display with an optimum distribution of temporal and/or spatial resolution for the associated class of motion magnitudes. Dependent on the class of motion determined, one of the preprocessing circuits is coupled to a channel. The signal to be supplied to the channel is therefore no compromise obtained by a weighted averaging of a signal suitable for a display with a large temporal resolution and a signal suitable for a display with a large spatial resolution, but it is a signal suitable for a display with an optimum distribution of temporal and/or spatial resolution for the given class of motion.

A normal definition MAC receiver is capable of displaying the compatible transmitted signal, but without being able to make use of the possibility of a display with a higher spatial resolution in the case of little or no motion.

The high definition receiving section of the system according to the invention also has at least three receiving section signal paths each decoding a received signal in accordance with a method associated with the relevant receiving section signal path. The correct receiving section signal path is selected in accordance with the class of motion, so that in the receiving section of the system according to the invention a display with an increasing spatial resolution can be achieved in the case of a decreasing motion.

Figure 2:
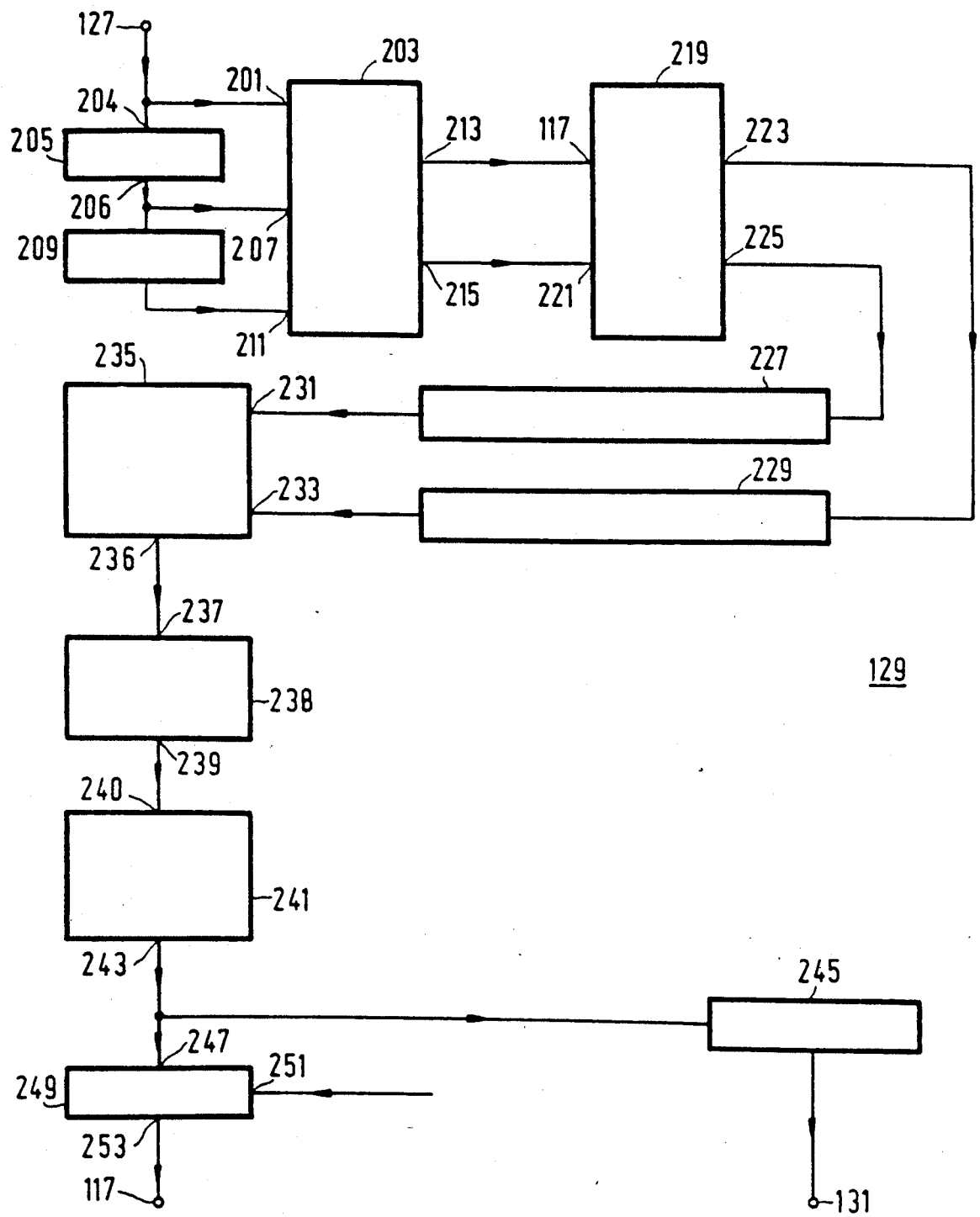
FIG. 2 is a block diagram of a motion processing circuit suitable for the transmitting section of FIG. 1A, FIGS. 3A, 3B1, 3B2 and 3C are block diagrams of preprocessing circuits suitable for the transmitting section of FIG. 1A, FIGS. 4A, 4B1, 4B2 and 4C illustrate the operation of sampling and interleaving circuits in the preprocessing circuits of FIGS. 3A, 3B1, 3B2 and 3C, as well as of deinterleaving circuits in a receiving section suitable for the system according to the invention.

FIG. 2 shows the motion processing circuit 129 in the transmitting section of FIG. 1A in greater detail, while disregarding the afore-mentioned possibility of transmitting a video signal suitable for a display with a higher spatial resolution in the case of uniform motion. The input 127 of the motion processing circuit 129 is connected to a first input 201 of a motion detector 203 and to an input 204 of a first field memory 205. An output 206 of the first field memory 205 is connected to a second input 207 of the motion detector 203 and via a second field memory 209 to a third input 211 of the motion detector 203. The motion detector 203 is of a type which distinguishes per pixel between (substantially) no motion (for example, less than 0.5 pixel per picture period), little motion (for example, more than 0.5 but fewer than 2 pixels per picture period) and considerable motion (for example, more than 2 pixels per picture period). The motion detector 203 has a first output 213 for supplying a signal indicating whether there is at least little motion, and a second output 215 for supplying a signal indicating whether there is considerable motion. The motion detector 203 may be considered to be constituted by a first and a second known motion detector the first of which detects little motion and the second of which detects considerable motion. The first output 213 of the motion detector 203 is connected to a first input 217 of a pixel-to-block motion converter 219, a second input 221 of which is connected to the second output 215 of the motion detector 203. The pixel-to-block motion converter 219 forms a motion classification per block of pixels from a block of motion classifications per pixel, for example, by comparing for each block the number of pixels classified as non-stationary by the first and the second motion detector with a first and a second threshold, respectively. The pixel-to-block motion converter 219 may be formed, for example, from separate pixel-to-block motion converters for each of the two input signals. Two outputs 223, 225 of the pixel-to-block motion converter 219 are connected via respective spatial consistency control circuits 227, 229 to inputs 231, 233, respectively, of a block motion control circuit 235. The spatial consistency control circuits 227 and 229 eliminate spatially isolated results of the pixel-to-block motion converter 219; this is based on the recognition that it is illogical if, for example, a block would be classified as fast moving in the midst of a setting of blocks classified as stationary. Signals at the outputs 223, 225 of the pixel-to-block motion converter 219 can only assume two values, namely stationary or non-stationary. Preferably, the spatial consistency control circuit 227, 229 act on these signals as follows:

1. If the motion classification of a given block is stationary and if at least two of the four horizontal or vertical neighbouring blocks of the motion classifications are non-stationary, then the motion classification of the given block must also become non-stationary.

2. If all eight surrounding blocks of the given block are stationary, then the motion classification of this given block must also become stationary.

3. If the motion classification of a given block is stationary and the motion classifications of at least one pair of diagonally neighbouring blocks are non-stationary, then the motion classification of the given block must also become non-stationary.

The block motion control circuit 235 decides with reference to output values of the spatial consistency control circuits 227 and 229 via which preprocessing circuit (143, 145 or 147 in FIG. 1A) the relevant block should have to be processed. In the aforedescribed film mode the block motion control circuit 235 only makes a choice, as stated, between the high-resolution preprocessing circuit 143 and the medium-resolution preprocessing circuit 145. Preferably, the block motion control circuit 235 operates in accordance with the Table below. The numbers between brackets indicate the refresh intervals of the picture information. As stated hereinbefore, a high spatial resolution is emphasized for the high resolution preprocessing circuit 143; the refresh interval of the picture information in this preprocessing circuit is therefore relatively long, for example, 80 ms. In contrast thereto a large number of motion phases per second is emphasized for the low resolution preprocessing circuit 147; the refresh interval is therefore relatively short, for example, 20 ms. Between these two extremes there is the refresh interval associated with the medium resolution preprocessing circuit 145 and being, for example, 40 ms. Since the television signal to be supplied by the transmitting section is compatible with the MAC television signal, the field frequency of the fields to be supplied is equal to 50 Hertz but this need not imply that there is new picture information every 20 ms. For example, for a refresh interval of 40 ms it is possible to transmit a first half of each high definition field to be transmitted in a first compatible field to be supplied and to transmit a second half in a second compatible field to be supplied.

| Motion decision per block | Motion larger than 0.5 pixel per picture period: | |
|---|---|---|
| | YES | NO |
| Motion larger than 2 pixels per picture period | YES circuit 147 (20 ms) NO circuit 145 (40 ms) | circuit 147 (20 ms) circuit 143 (80 ms) |

An output 236 of the block motion control circuit 235 is connected to an input 237 of a field rate control member 238. The decision of the block motion control circuit 235 is converted by the field rate control member 238 into a route of time-sequential blocks by the preprocessing circuits 143, 145 and 147. As will be evident from the following description, only the following 5 routes are possible for four temporally sequential blocks from four successive fields:

Route 1: all four blocks via the high resolution preprocessing circuit 143;
Route 2: all four blocks via the medium resolution preprocessing circuit 145;
Route 3: the first two blocks via the medium resolution preprocessing circuit 145, the last two via the low resolution preprocessing circuit 147;
Route 4: the first two blocks via the low resolution preprocessing circuit 147, the last two via the medium resolution preprocessing circuit 145;
Route 5: all four blocks via the low resolution preprocessing circuit 147.

These routes may also be characterized by the refresh interval of the picture information. Characterized by the refresh interval of 20, 40 or 80 ms the routes are as follows:

| Field: | 1 | 2 | 3 | 4 |
|---|---|---|---|---|
| Route 1: | 80 | 80 | 80 | 80 |
| Route 2: | 40 | 40 | 40 | 40 |
| Route 3: | 40 | 40 | 20 | 20 |
| Route 4: | 20 | 20 | 40 | 40 |
| Route 5: | 20 | 20 | 20 | 20 |

It will be evident that the choice of "distributing" the picture information of a high definition picture over four compatible fields to be transmitted so as to obtain a display with a maximum possible spatial resolution will imply that this choice must also be maintained during four successive field periods. Therefore there is only one route possible with blocks having a refresh interval of 80 ms. Equally, a choice of "distributing" the picture information of a high-definition field over two compatible fields to be transmitted will also have to be maintained during two successive field periods so that blocks having a refresh interval of 40 ms each time occur in pairs, see the routes 2, 3 and 4. It follows from the foregoing that a sixth route with refresh intervals of successively 20, 40, 40 and 20 is principally also possible. The incorporation of this route is deliberately disregarded due to the fact that it makes little sense to have a few blocks with a higher spatial resolution for a short time in a temporally sequential series of blocks at a given location in a picture so that it is preferred to transmit a larger number of motion phases per second.

The decisions of the block motion control circuit 235 of an interval of 80 ms, as well as of two fields preceding and of two fields following of the interval of 80 ms are preferably included in the route decision by the field rate control member 238 according to the invention, more specifically in accordance with the following Table in which "—" means that the value is not important and "/20" means that the refresh interval is not equal to 20 ms, but to 40 ms or 80 ms.

| Field: | Decision block motion control circuit | | | | | | | | New decision | Route |
|---|---|---|---|---|---|---|---|---|---|---|
| | −1 | 0 | 1 | 2 | 3 | 4 | 5 | 6 | | |
| | /20 | /20 | 80 | 80 | 80 | 80 | /20 | /20 | 80-80-80-80 | 1 |
| | — | — | 80 | 80 | 80 | 80 | — | 20 | 40-40-40-40 | 2 |
| | — | — | 80 | 80 | 80 | 80 | 20 | — | 40-40-40-40 | 2 |
| | — | 20 | 80 | 80 | 80 | 80 | — | — | 40-40-40-40 | 2 |
| | 20 | — | 80 | 80 | 80 | 80 | — | — | 40-40-40-40 | 2 |
| | — | — | /20 | /20 | /20 | 40 | — | — | 40-40-40-40 | 2 |
| | — | — | /20 | /20 | 40 | /20 | — | — | 40-40-40-40 | 2 |
| | — | — | /20 | 40 | /20 | /20 | — | — | 40-40-40-40 | 2 |
| | — | — | 40 | /20 | /20 | /20 | — | — | 40-40-40-40 | 2 |
| | — | — | /20 | /20 | — | 20 | — | — | 40-40-20-20 | 3 |
| | — | — | /20 | /20 | 20 | — | — | — | 40-40-20-20 | 3 |
| | — | — | — | 20 | /20 | /20 | — | — | 20-20-40-40 | 4 |
| | — | — | 20 | — | /20 | /20 | — | — | 20-20-40-40 | 4 |
| | — | — | — | 20 | — | 20 | — | — | 20-20-20-20 | 5 |
| | — | — | — | 20 | 20 | — | — | — | 20-20-20-20 | 5 |
| | — | — | 20 | — | — | 20 | — | — | 20-20-20-20 | 5 |
| | — | — | 20 | — | 20 | — | — | — | 20-20-20-20 | 5 |

This Table is based on the previously mentioned recognition that it makes little sense to have a few blocks with a higher spatial resolution for a short time in a temporally sequential series of blocks at a given location in a picture, so that it is preferred to transmit a larger number of motion phases per second.

An output 239 of the field rate control member 238 is connected to an input 240 of a route-consistency control member 241. The routes selected by the field rate control member 238 are checked by the route-consistency control member 241 and, if necessary, adapted on the basis of a spatial and temporal consistency so that illogical decisions are corrected. The following explanation of the operation of the route-consistency control member 241 is based on the sequence: first spatial and then temporal. A reverse order or a composite algorithm is alternatively possible.

Around a block the routes of the surrounding blocks are compared and in certain cases the modifications mentioned below are carried out. The direction of these modifications is always such that the minimum number of troublesome artefacts are created. This means that there is often more preference for motion and less for spatial resolution. The modifications 1 to 4 below are performed one after the other in the following sequence.

1. If all eight surrounding blocks of a given block have an equal route, then the route of this given block must be rendered equal thereto.

2. Modification of an isolated 80-block: if the route of a given block is 1 (refresh interval 80 ms in four successive fields), in which the routes of the four horizontal and vertical neighbouring blocks are all unequal to 1, then the route of the given block must become equal to 2 (refresh interval 40 ms in four successive fields).

3. Modification of an isolated 20-block:

3.1 If the route of a given block is 4 (refresh interval 20 ms in two successive fields and refresh interval 40 ms in the subsequent two successive fields) and if none of the surrounding blocks has this route 4 or route 5 (refresh interval 20 ms in four successive fields), then the route of the given block must become equal to 2.

3.2 If the route of a given block is 3 (refresh interval 40 ms in two successive fields and refresh interval 20 ms in the subsequent two successive fields) and if none of the surrounding blocks has this route 3 or route 5, then the route of the given block must become equal to 2.

3.3 If the route of a given block is 5, in which none of the surrounding blocks has route 3 or route 4 or this route 5, the route of the given block must become equal to 2.

3.4 If the route of a given block is 5, in which none of the surrounding blocks has route 4 or this route 5, and if at least one surrounding block has route 3, the route of the given block must become equal to 3.

3.5 If the route of a given block is 5, in which none of the surrounding blocks has route 3 or this route 5, and if at least one surrounding block has route 4, then the route of the given block must become equal to 4.

4. Modification of an isolated 40-block:

4.1 If the route of a given block is 2, in which none of the surrounding blocks has this route 2 or route 3, and if at least one surrounding block has route 4, then the route of the given block must become equal to 4.

4.2 If the route of a given block is 2, in which none of the surrounding blocks has this route 2 or route 4, and if at least one surrounding block has route 3, then the route of the given block must become equal to 3.

4.3 If the route of a given block is 2, in which none of the surrounding blocks has this route 2 or route 3 or route 4, and if at least three surrounding blocks have route 5, then the route of the given block must become equal to 5.

4.4 If the route of given block is 2, in which none of the surrounding blocks has this route 2 or route 3 or route 4, and if at most two surrounding blocks have route 5, the route of the given block must become equal to 1.

4.5 If the route of a given block is 3, in which none of the surrounding blocks has route 2 or this route 3, then the route of the given block must become equal to 5.

4.6 If the route of a given block is 4, in which none of the surrounding blocks has route 2 or this route 4, then the route of the given block must become equal to 5.

Subsequently a temporal consistency algorithm follows in which three successive periods of 80 ms of a block are considered.

1. If the routes of the previous and subsequent 80 ms periods are equal to 5, then the route of the current period must also become equal to 5.

2. Modification of temporally isolated route 1:

If the route of the current period is equal to 1 and the routes of the previous and subsequent periods of 80 ms are not equal to 1, then the route of the current period must become equal to 2.

3. Modification of temporally isolated route 2:

If the route of the current period is equal to 2, in which the route of the previous period of 80 ms is equal to 3 or 5 and the route of the subsequent period of 80 ms is equal to 4 or 5, the route of the current period must become equal to 5.

4. Modification of temporally isolated route 3:

If the route of the current period is equal to 3 and the route of the previous period of 80 ms is equal to 3, 4 or 5, the route of the current period must become equal to 5.

5. Modification of temporally isolated route 4:

If the route of the current period is equal to 4 and the route of the subsequent period of 80 ms is equal to 3, 4 or 5, then the route of the current period must become equal to 5.

An output 243 of the afore-described route consistency control member 241 is connected via a route decoding circuit 245 to the output 131 of the motion processing circuit 129. The output 243 of the route consistency control member 241 is also connected to a first input 247 of a DATV encoding circuit 249. The DATV encoding circuit 249 has a second input 251 for applying a chrominance routing signal thereto and an output 253 which is connected to the data output 117 of the motion processing circuit 129.

Figure 3A:
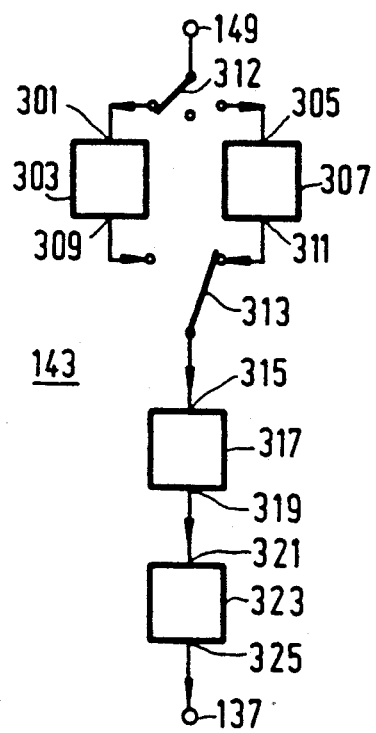

In FIGS. 3A, 3B1/3B2 and 3C the preprocessing circuits or branches 143, 145 and 147, respectively, of FIG. 1A are shown in greater detail. In the high resolution preprocessing circuit 143 shown in FIG. 3A a switch 312 is connected to the output 149 of the memory 125 which establishes a connection with an input 301 of a picture memory 303 in a first position, establishes no connection in an intermediate position and establishes a connection with an input 305 of a picture memory 307 in a third position. A switch 313 connects an input 315 of a two-dimensional filter 317 to an output 309 of the picture memory 303 or to an output 311 of the picture memory 309. An output 319 of the two-dimensional filter 317 is connected to an input 321 of a sampling and line-interleaving circuit 323 an output 325 of which is connected to the input 137 of the change-over switch 135 of FIG. 1A. The switches 312 and 313 shown may also be omitted if suitable read and write signals are presented to read and write signal inputs (not shown) of the picture memories 303 and 307, so that the same operation can be realized.

As already stated, the high resolution preprocessing circuit 143 is adapted to supply a high resolution video signal, that is to say, a video signal suitable for a display with a maximum possible spatial resolution. To this end the first two, fields together constituting a full high definition picture, or eight successive field are written in the picture memory 303 via the switch 312. Subsequently the switch 312 is in the disconnected intermediate position during the next two fields which are thus not processed. The fifth and the sixth field are written in the picture memory 307 and then the switch 312 is again in the dis-connected intermediate position during the next two fields. The switch 313 each time connects one of the two picture memories 303 or 307 to the two-dimensional spatial filter 317 whose frequency response is diagrammatically shown by means of a solid line in FIG. 5A. As in FIGS. 5B1, 5B2 and 5C, FIG. 5A shows vertical frequencies Fv plotted vertically and expressed in cph (cycles per picture height) and horizontal frequencies Fh expressed in cpw (cycles per picture width) plotted horizontally. The two fields are sampled by the sampling and line-interleaving circuit 323 in accordance with a sampling pattern shifted from one field to be transmitted to another field to be transmitted, subsequently the obtained samples of two lines each are interleaved for obtaining fields to be supplied at the channel 170 of FIG. 1A, which fields are presented to the input 137 of the change-over switch 135.

The operation of the sampling and line-interleaving circuit 323 will be explained with reference to FIG. 4A. This Figure consists of three columns L, M and R. The left-hand column L states how a number of portions, shown one below the other, of successive high-definition fields from a camera (hereinafter to be referred to as camera fields) are sampled. The samples are denoted by three-digit numbers, the left-hand digit indicating from which camera field the sample originates, the central digit indicating from which line the sample originates and the right-hand digit indicating from which position on the line the sample originates. It is assumed that a high-definition camera field comprises twice as many lines and twice as many pixels on a line as a field to be transmitted, that the field number of camera fields and fields to be transmitted is equal and that a picture is constituted by two interlaced fields both in camera fields and fields to be transmitted. For each field a point of intersection of a horizontal and a vertical dash indicates the position of the first pixel on the first line. In the situation shown only the first picture of two successive pictures is sampled. However, it is alternatively possible to sample both pictures for which the numbers 113, 131, 153, 171, 224, 242, 264 and 282 in the left-hand column L of FIG. 4A must be replaced by 313, 331, 353, 371, 424, 442, 464 and 482, respectively. In the case of really stationary pictures the result of the two possibilities will be equal, in the case of little motion the second possibility will result in a slightly more smoothly blending display with some more blur than the first-mentioned possibility. The central column M indicates how the samples of these successively sampled camera fields are interleaved (shuffled). In a normal definition receiver the transmitted fields will be displayed as they are received. However, in a high definition receiver four received fields, as indicated in the right-hand column R, are combined to obtain a high resolution signal. This combination may be effected in two ways, namely by combining the last four received fields once per field period and displaying the result then obtained, or by combining the last four received fields once per four field periods and displaying the result then obtained during four field periods. In the case of fully stationary pictures the difference between the results of the two methods can of course not be distinguished, but in the case of little motion the first method will lead to a blending result with a slight motion blur and the second method will lead to a result without motion blur but with a slightly juddering display of the motion. Irrespective of the use of these combination methods, the samples which are still missing can be obtained by interpolation. This may be effected, for example, by replenishing the field in the right-hand column R obtained by combination with samples of the value zero at the missing locations and by applying the replenished field to the same two-dimensional low-pass filter as the two-dimensional low-pass filter 317 in the transmitting section of FIG. 1A.

FIG. 3B1 shows the medium resolution preprocessing circuit 145 of FIG. 1A in which a switch 342 is connected to the output 149 of the memory 125 of FIG. 1A, which switch establishes a connection with an input 331 of a picture memory 333 in a first position and which establishes a connection with an input 335 of a picture memory 337 in a second position. A switch 343 connects an input 345 of a two-dimensional filter 347 to an output 339 of the picture memory 333 or to an output 341 of the picture memory 337. An output 349 of the two-dimensional filter 347 is connected to an input 351 of a sampling circuit 353 an output 355 of which is connected to the input 139 of the change-over switch 135 of FIG. 1A.

As has been stated, the medium-resolution preprocessing circuit 145 is adapted to supply a medium resolution video signal, that is to say, a video signal suitable for a display with a temporal resolution which is twice as high as in the previous case and with a vertical resolution which is twice as small as in the previous case. To this end pairs of successive camera fields together constituting a high-definition picture are each time alternately written via the switch 342 in the picture memory 333 or in the picture memory 337. While the one picture memory 333 or 337 is being written, the other picture memory 337 or 333, respectively, is being read. The signal filtered by the two-dimensional filter 347, which signal is band-limited in accordance with FIG. 5B, is subsequently sampled by the sampling circuit 353 in accordance with a sampling pattern which is shifted from one field to be transmitted to another field to be transmitted and is subsequently presented to the input 139 of the change-over switch 135 of FIG. 1A.

The operation of the sampling circuit 353 will be explained with reference to FIG. 4B1. This Figure consists of two columns L and R. The left-hand column L states how the successive high-definition camera fields are sampled. For the first field to be transmitted samples from the lines 1+4 n are used from the first camera field, in which n is an integer. For the second field to be transmitted samples from the lines 3+4 n are used from the first camera field. The samples without a three-digit number are not transmitted. The fields to be transmitted are thus obtained by means of so-called artificial interlacing from the odd camera fields. In this method the second camera field of each pair of camera fields is thus not sampled. A normal definition receiver will display the received fields as shown in the left-hand column L. A high definition receiver will combine two received fields as shown in the right-hand column R in which there is again a choice between a combination of the last two received fields once per field period or once per picture period. In the latter case the result thus obtained will be displayed during two field periods. Samples which are still missing can be obtained by means of interpolation.

Figure 4A:
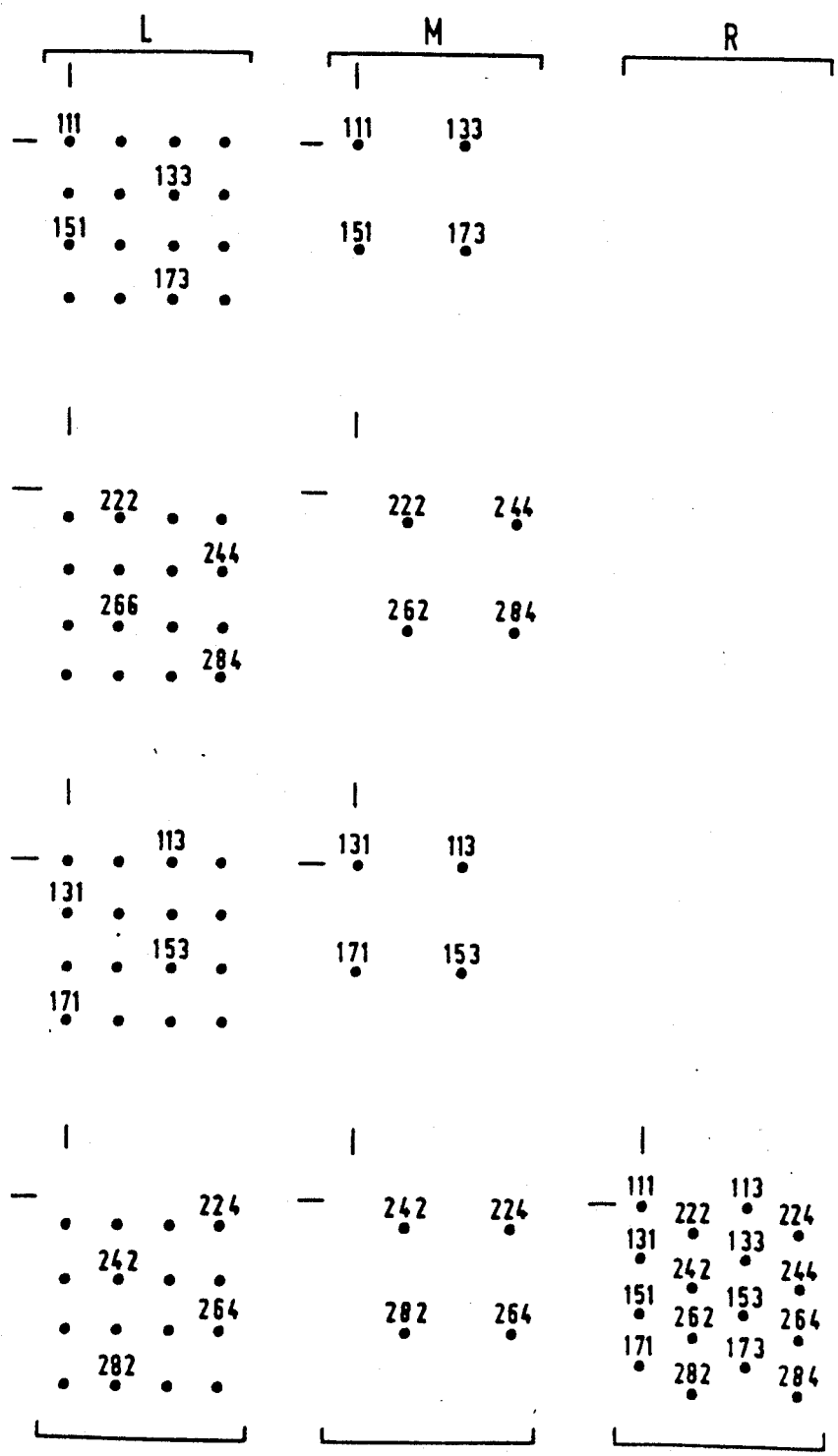

When comparing the right-hand column R of FIG. 4A with the right-hand column R of FIG. 4B1 it will be noticed that the number of pixels on each line is equal and that the number of lines in the right-hand column of FIG. 4A is twice as high as that in the right-hand column R of FIG. 4B1. Thus, the horizontal resolution is equal in both cases, but the vertical resolution in FIG. 4B1 is halved with respect to that in FIG. 4A. In contrast thereto, new information is available every 40 ms in FIG. 4B1, which was the case every 80 ms in FIG. 4A, so that the temporal resolution in FIG. 4B1 is doubled with respect to that in FIG. 4A.

FIG. 4B2 shows an alternative in which there is a loss of horizontal resolution with respect to FIG. 4B1, but a gain in vertical resolution, with the temporal resolution remaining the same. FIG. 4B2 consists of three columns L, M and R. The left-hand column L states how the high definition camera fields are sampled. The central column M states how the samples obtained each time from two sampled camera fields are combined by means of field interleaving (field shuffling) operations to form fields to be transmitted. Such field interleaving operations are described in European Patent Application EP-A 0,252,563 (U.S. Pat. No. 4,845,561 and are therefore not further referred to. A normal definition receiver will display the transmitted fields as they have been received and a high definition receiver will combine each time two received fields as shown in the right-hand column R of FIG. 4B2, while samples which are still missing can be obtained by means of interpolation.

When comparing the right-hand columns R of FIGS. 4B1 and 4B2 it will be noticed that the number of samples transmitted of each line is twice as high in FIG. 4B1 as in FIG. 4B2, so that the horizontal resolution in FIG. 4B1 is twice that in FIG. 4B2; on the other hand the number of lines transmitted in FIG. 4B2 is twice as high as in FIG. 4B1 so that the vertical resolution in FIG. 4B2 is twice that in FIG. 4B1.

In an alternative medium resolution preprocessing circuit 145', which is shown in FIG. 3B2, a measuring circuit 357 measures whether more high horizontal frequencies than high vertical frequencies occur in a given part of the picture, which is preferably a block. If so, a first subbranch comprising the two-dimensional filter 347 and the sampling circuit 353 is activated which operates as is shown in FIG. 4B1, and if not, a second subbranch comprising a two-dimensional filter 347' and a sampling and field-interleaving circuit 353' is activated which operates as is shown in FIG. 4B2. In FIG. 3B2 a common terminal of the switch 343 is connected to an input 356 of the measuring circuit 357 which controls a switch 358. The input 345 of the two-dimensional filter 347 and an input 345' of the two-dimensional filter 347' are both directly connected to the common terminal of the switch 343. An output 349' of the two-dimensional filter 347' is connected to an input 351' of the sampling and field-interleaving circuit 353'. The output 355 of the sampling circuit 353 is connected to a first switching contact of the switch 358, an output 355' of the sampling and field-interleaving circuit 353' is connected to a second switching contact of the switch 358 and a common terminal of the switch 358 controlled by the measuring circuit 357 is connected to the input 139 of the change-over switch 135 of FIG. 1A. The switch 358 thus selects with reference to spatial frequencies measured by the measuring circuit 357 whether an output signal of the first subbranch comprising the afore-described two-dimensional filter 347 and the sampling circuit 343, or an output signal of the second subbranch comprising the two-dimensional filter 347' and the sampling and field-interleaving circuit 353' is applied to the input 139 of the change-over switch 135 of FIG. 1A. Information about the selected subbranch in the transmitting section is transmitted via the DATV auxiliary signal to enable the receiving section to decode the received television signal in the correct manner.

As is shown in FIG. 5B2, the two-dimensional filter 347' has a cut-off frequency for vertical frequencies which is twice as high and a cut-off frequency for horizontal frequencies which is half as low as compared with the two-dimensional filter 347.

Figure 3C:
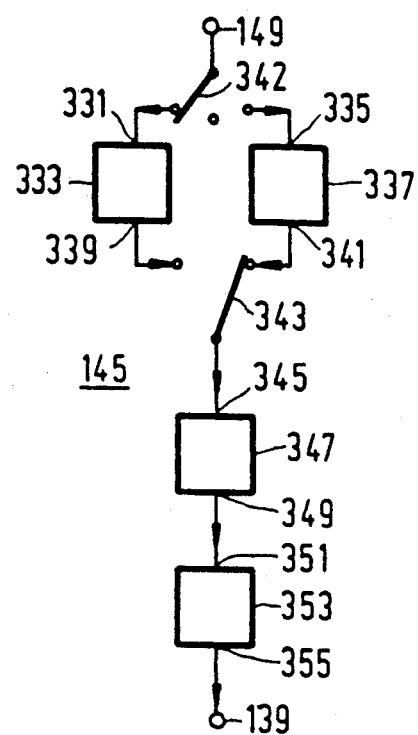
Figure 3C:
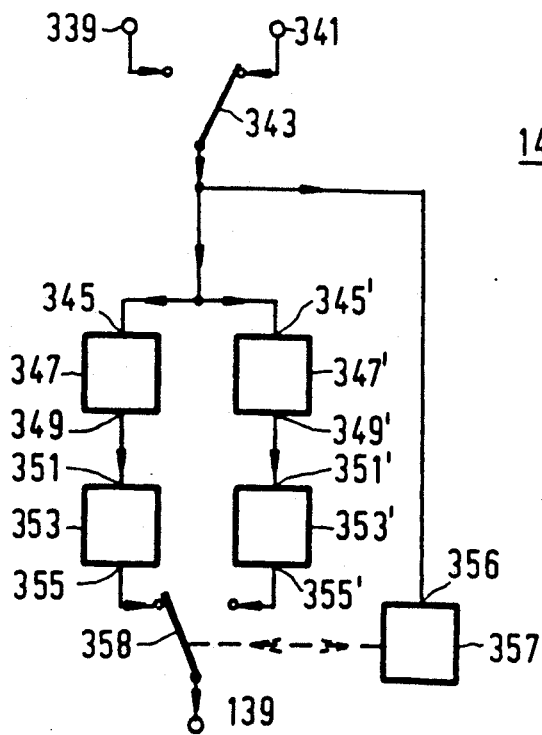
Figure 3C:
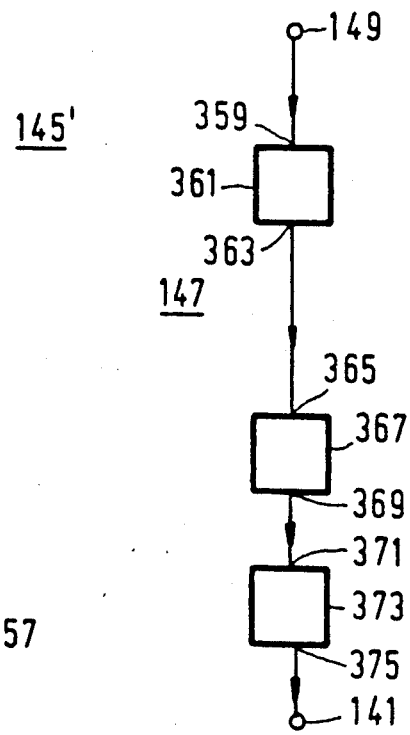

FIG. 3C shows the low resolution preprocessing circuit 147 of FIG. 1A, in which an input 359 of a picture memory 361 is connected to the output 149 of the memory 125 of FIG. 1A, an output 363 of said memory being connected to an input 365 of a two-dimensional filter 367. An output 369 of the two-dimensional filter 367 is connected to an input 371 of a sampling and line-interleaving circuit 373, an output 375 of which is connected to the input 141 of the change-over switch 135 of FIG. 1A.

Figure 4C:
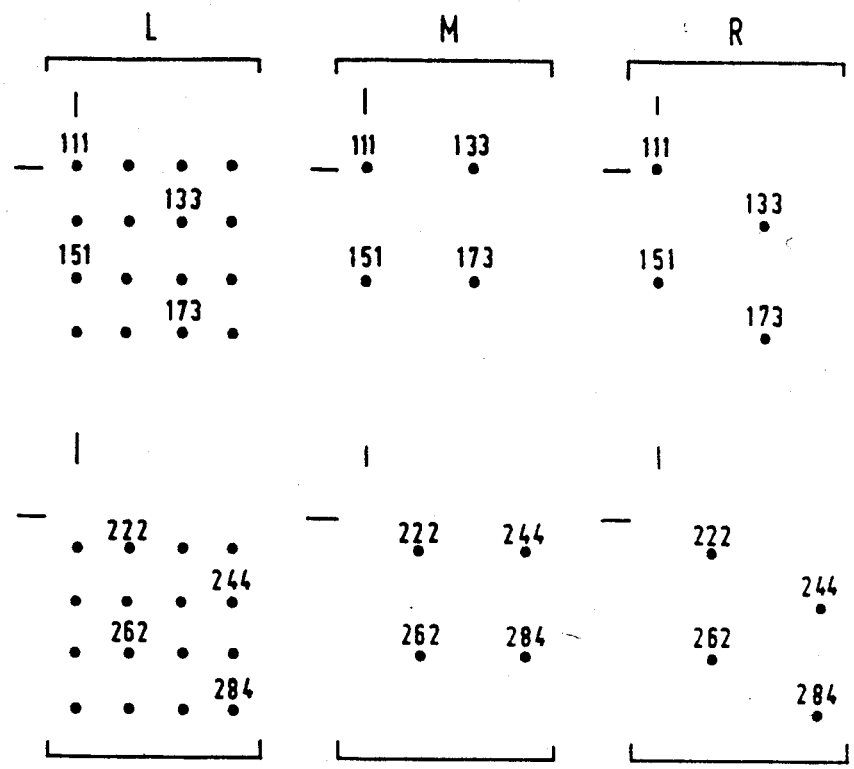

As has been stated, the low resolution preprocessing circuit 147 shown in FIG. 3C is adapted to apply a low resolution video signal to the input 141 of the change-over switch 135, that is to say, a video signal having the same spatial and temporal resolution as a normal-definition signal. The picture memory 361 is used to obtain a time delay which is equal to the time delays of the picture memories 303, 307, 333 and 337 in FIGS. 3A and 3B1. An example of a diagrammatic frequency response of the two-dimensional filter 367 is shown by means of a solid line in FIG. 5C. A suitable operation of the sampling and line-interleaving circuit 373 is shown in FIG 4C consisting of three columns L, M and R. The left-hand column L states how two successive camera fields are sampled, the central column M states how the samples thus obtained are interleaved so as to be transmitted. A normal definition receiver will display the received fields as shown in the central column M and a high-definition receiver will de-interleave the samples as shown in the right-hand column R and will subsequently interpolate the missing samples. In this case each received field is separately displayed in the high-definition receiver so as to obtain a maximum temporal resolution; thus a higher spatial resolution to be obtained by combination of received fields is deliberately disregarded in this case, noting that the combination of fields which are considerably moved with respect to each other would lead to a troublesome motion blur.

FIG. 5C shows two alternative frequency responses of a two-dimensional spatial low-pass filter by means of a broken line and a dotted line, which filters may be activated if there are many high horizontal or many high vertical frequencies in a (part of a) picture of the high-definition signal. In a comparable manner shown in FIG. 3B2, parallel subbranches may also be activated in the circuit of FIG. 3C by means of a change-over switch controlled by a measuring circuit. Generally it is then not sufficient to have a different filter but a different sampling and interleaving circuit will also have to be provided. All three variants shown in FIG. 5C may, however, be used in combination with the same sampling and interleaving circuit. Also in the circuit of FIG. 3A parallel subbranches with alternative filters and sampling and line-interleaving circuits may in principle be activated by a change-over switch operated by a measuring circuit. In a practical realization of a preprocessing circuit the filtering, sampling and interleaving operations can be combined to a single operation. Resampling of a signal which has already been sampled can be realized in a simple way if the original sampling frequency is a multiple of the new sampling frequency, as is the case here, by multiplying the samples to be omitted by a zero coefficient so that the filtering and sampling operations can be combined in a simple manner. Parallel (sub-)branches as described hereinbefore can then be integrated to a single branch to which different collections of (filter) coefficients are presented dependent on the spatial frequencies.

Figure 6:
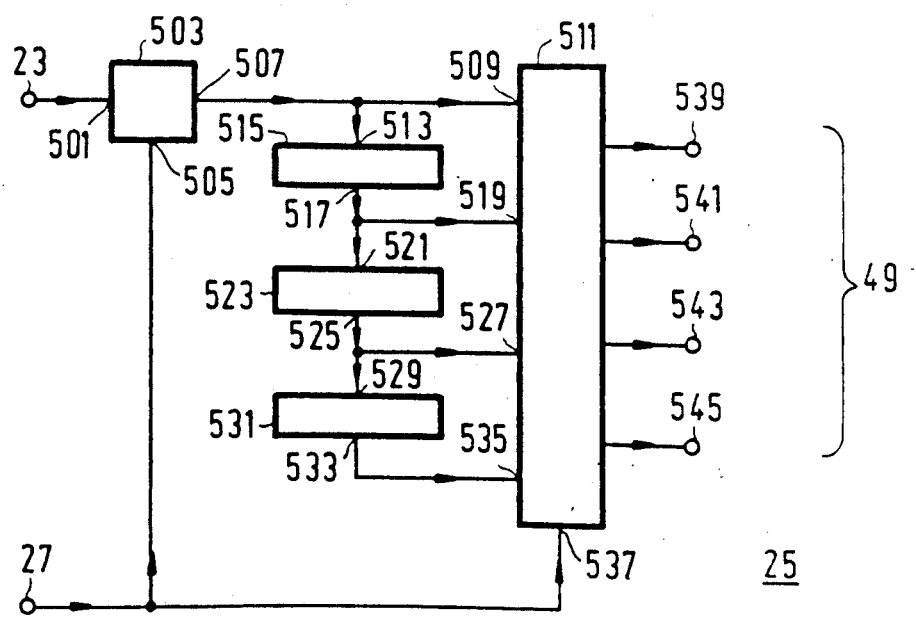
FIG. 6 is a block diagram of an intermediate processing circuit suitable for the receiving section of FIG. 1B.

FIG. 6 is a block diagram of an intermediate processing circuit 25 suitable for the receiving section according to FIG. 1B. Its input 23 is connected to a video signal input 501 of a de-interleaving or inverse shuffling circuit 503, a control input 505 of which is connected to the control input 27 of the intermediate processing circuit 25. An output 507 of the de-interleaving circuit 503 is connected to a first input 509 of a switching member 511 and to an input 513 of a first field memory 515. An output 517 of this first field memory 515 is connected to a second input 519 of the switching member 511 and to an input 521 of a second field memory 523. An output 525 of the second field memory 523 is connected to a third input 527 of the switching member 511 and to an input 529 of a third field memory 531. An output 533 of the third field memory 523 is connected to a fourth input 535 of the switching member 511. A control input 537 of the switching member 511 is connected to the control input 27 of the intermediate processing circuit 25. The switching member 511 supplies at four terminals 539, 541, 543 and 545 together constituting the four-fold output 49 of FIG. 1B, samples from four successively received compatible fields to the postprocessing circuits 43, 45 and 47 of FIG. 1B.

Figure 7:
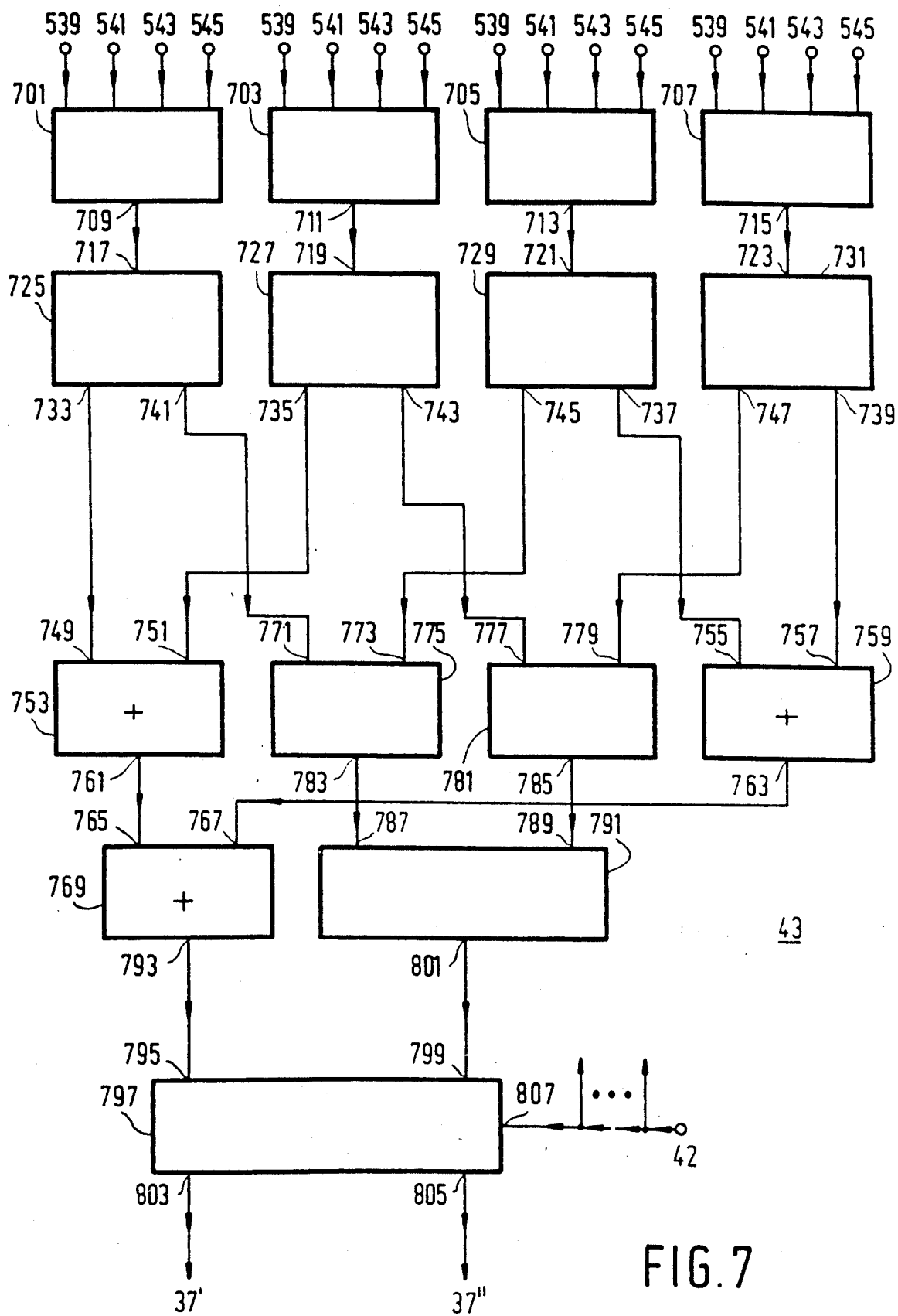
FIG. 7 is a block diagram of a high-resolution postprocessing circuit suitable for the receiving section of FIG. 1B.

FIG. 7 is a block diagram of a high resolution post-processing circuit 43 suitable for the receiving section of FIG. 1B. The terminals 539, 541 543 and 545 are connected to four inputs of each one of four sampling pattern conversion circuits 701, 703, 705 and 707. Each sampling pattern conversion circuit 701, 703, 705 and 707 has an output 709, 711 and 713, 715, respectively, which is connected to an input 717, 719, 721 and 723, respectively of filter sections 725, 727, 729 and 731, respectively. Each filter section 725, 727, 729, 731 has a first output 733, 735, 737, 739, respectively, for supplying partial interpolation results of the non-transmitted samples, and a second output 741, 743, 745, 747, respectively, for supplying copies of the samples which have been transmitted or which have already been calculated by the sampling pattern conversion circuits.

The sampling pattern conversion circuits 701, 703, 705 and 707 and filter sections 725, 727, 729 and 731 operate as follows. In the transmitting section of the afore-described system the high definition fields are sampled in accordance with a number of sampling patterns dependent on the motion and/or spatial frequencies occurring in the video signal. The resultant samples are subsequently, as far as necessary, interleaved so as to obtain a compatible television signal. If in the case of (substantially) no motion a choice has been made for transmitting the signal processed in the transmitting section by the high-resolution preprocessing circuit 143, which signal is suitable for a display with a high spatial resolution, then this means that in the described design of the system a block of pixels from one high definition picture is distributed over four compatible fields to be transmitted as is shown in FIG. 4A. The blocks surrounding this relevant block may be sampled in accordance with the same sampling pattern but also in accordance with a different pattern. This juxtaposition of blocks sampled in accordance with different sampling patterns has the drawback that these blocks cannot readily be processed by an interpolation filter. This drawback does not occur if the amount of motion and spatial frequencies occurring in the video signal is not considered per block but per picture. This drawback can be solved by having the incoming fields processed by the sampling pattern conversion circuits 701, 703, 705 and 707 prior to the filtering operation by the filter sections 725, 727, 729 and 731, which conversion circuits convert the sampling patterns of the blocks sampled in accordance with different sampling patterns to the sampling pattern of the relevant block. This sampling pattern conversion can be considered as a kind of interpolation and in principle it is not impossible to integrate the sampling pattern conversion circuits with the filter sections to form one complex interpolator. However, in the current state of the art it is simpler to carry out sampling pattern coversion and filtering separately. A maximum of four successive fields is required for the sampling pattern conversion, more specifically if a field is sampled as shown in FIG. 4A so as to obtain the "full" sampling pattern of a block to be converted. The full sampling pattern is understood to mean the collection of the four separate sampling patterns of each received field as is shown in the right-hand column R of FIG. 4A. The full sampling pattern may be imagined to be obtained by superimposing the partial sampling patterns from four successive fields at the outputs of the sampling pattern conversion circuits 701, 703, 705 and 707. Starting from the full sampling pattern of a block to be converted, a block with the sampling pattern of the relevant signal path is generated in the sampling pattern conversion circuits. In the case of FIG. 7 the sampling patterns of the fields which have been sampled in accordance with the medium resolution or low resolution sampling patterns are converted to the high resolution sampling pattern.

In the circuit described a choice has been made for performing the interpolation in parts by way of four separate filter sections. As has been stated, high resolution blocks are distributed over four fields. Each of these fields is separately processed by one of the filter sections whereafter the obtained partial interpolation results are added together to come to a full interpolation result. This method is chosen because of its simple implementation; other more integrated interpolation techniques are of course alternatively possible. Each sampling pattern conversion circuit 701, 703, 705 and 707 applies a part of a full sampling pattern located in one field to the filter sections 725, 727, 729 and 731, respectively, connected thereto. For adding the partial interpolation results the output 733 of the filter section 725 and the output 735 of the filter section 727 are connected to a first input 749 and to a second input 751, respectively, of a first adder circuit 753, and the output 737 of the filter section 729 and the output 739 of the filter section 731 are connected to a first input 755 and to a second input 757, respectively, of a second adder circuit 759. An output 761 of the first adder circuit 753 and an output 763 of the second adder circuit 759 are connected to a first input 765 and to a second input 767, respectively, of a third adder circuit 769. In principle it is of course possible to add the four partial interpolation results in a different way; the method described in which each time two partial results are added is, however, the simplest method in the current state of the art, but other solutions are alternatively possible.

In a comparable way, the output 741 of the filter section 725 and the output 753 of the filter section 729 are connected to a first input 771 and to a second input 773, respectively, of a first switching member 775, and the output 743 of the filter section 727 and the output 747 of the filter section 731 are connected to a first input 777 and to a second input 779, respectively, of a second switching member 781. An output 783 of the first switching member 775 and an output 785 of the second switching member 781 are connected to a first input 787 and to a second input 789, respectively, of a third switching member 791. In principle it is alternatively possible to combine the copied samples from the four fields in a different manner; the method described in which each time two partial results are combined is, however, the simplest method in the current state of the art, but other solutions are alternatively possible. An output 793 of the third adder circuit 769 is connected to an input 795 of a fourth switching member 797, a second input 799 of which is connected to an output 801 of the third switching member 791. The fourth switching member 797 has a first output 803 and a second output 805 for applying odd and even signal samples, respectively, to inputs 37' and 37", respectively, of the change-over switch 35 of FIG. 1B which together constitute the dual input 37 thereof. The odd and even signal samples are supplied via these separate outputs because the number of bits per second of an output signal at each of the outputs is halved with respect to a situation in which a full output signal would be supplied at only one single output. The solution chosen is the simplest solution in view of the current state of the art and the high numbers of bits per second occurring in high-definition television. However, with the advance of technology the other solution using only one output may become preferable.

FIG. 7 shows that the control input 42 of the high-resolution postprocessing circuit 43 is connected to a control input 807 of the fourth switching member 797. The control input 42 is of course also connected to control inputs (not shown) of the other switching members 775, 781 and 791 and of the sampling pattern conversion circuits 701, 703, 705 and 707.

Figure 8:
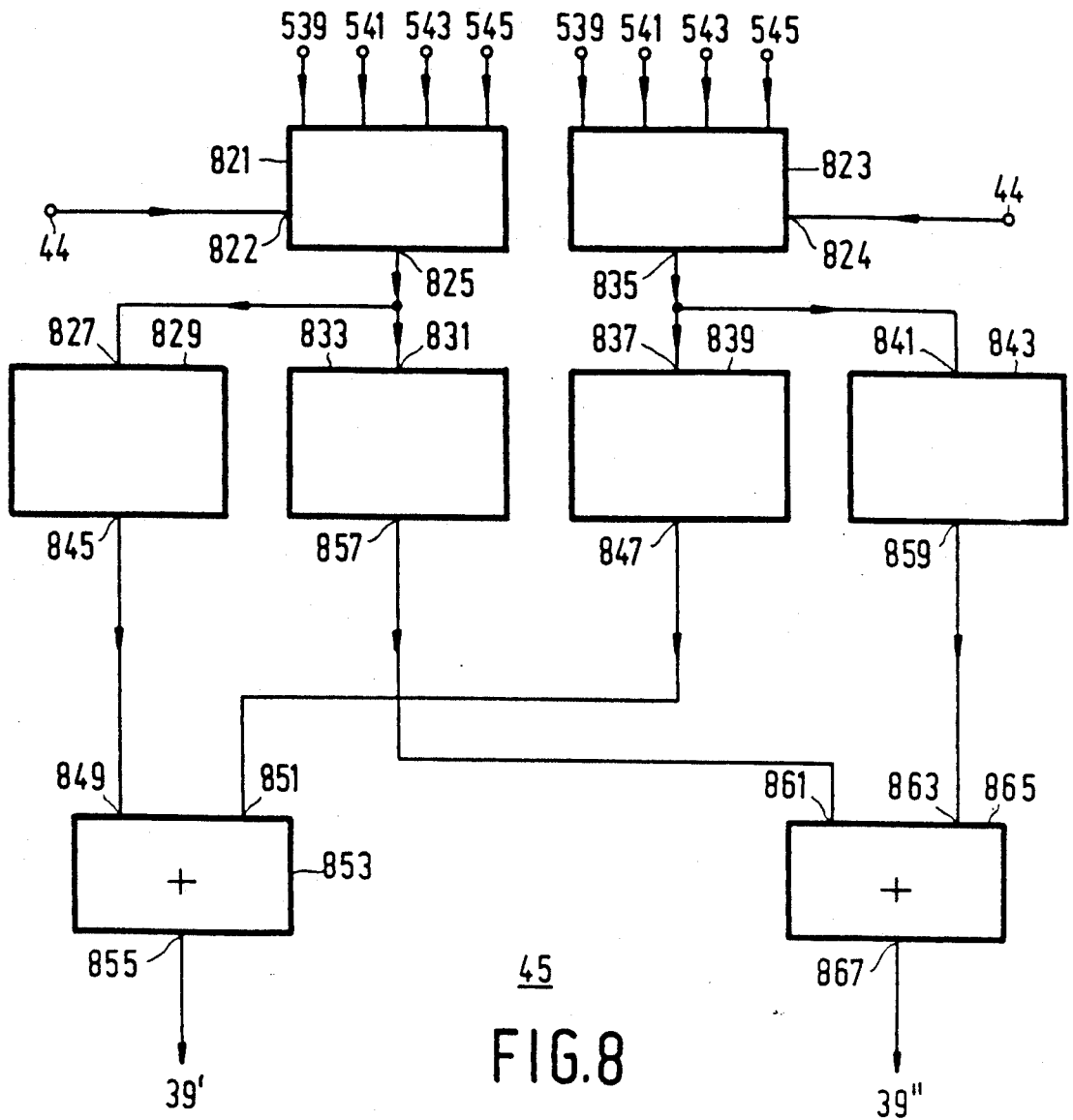
FIG. 8 is a block diagram of an medium-resolution postprocessing circuit suitable for the receiving section of FIG. 1B.

FIG. 8 is a block diagram of a medium resolution postprocessing circuit 45 suitable for the receiving section according to FIG. 1B. The terminals 539, 541, 543 and 545 are connected to four inputs of a first sampling pattern conversion circuit 821 and to four inputs of a second sampling pattern conversion circuit 823. The first sampling pattern conversion circuit 821 has an output 825 which is connected to an input 827 of a filter section 829 for calculating a partial interpolation result of odd samples and which is connected to an input 831 of a filter section 833 for calculating a partial interpolation result of even samples. The second sampling pattern conversion circuit 823 has an output 835 which is connected to an input 837 of a filter section 839 for calculating a partial interpolation result of odd samples and which is connected to an input 841 of a filter section 843 for calculating a partial interpolation result of even samples. Outputs 845 and 847 of the filter sections 829 and 839 are connected to inputs 849 and 851, respectively, of a first adder 853 which supplies an interpolation result of odd samples at an output 855 which is connected to an input 39' of the change-over switch 35 of FIG. 1B. Outputs 857 and 859 of the filter sections 833 and 843 are connected to inputs 861 and 863, respectively, of a second adder 865 which supplies an interpolation result of even samples at an output 867 which is connected to an input 39" of the change-over switch 35 of FIG. 1B. Together with the input 39" the input 39' constitutes the dual input 39 of the change-over switch 35 of FIG. 1B.

The control input 44 of the medium resolution postprocessing circuit 45 is connected to an input 822 of the sampling pattern conversion circuit 821 and to an input 824 of the sampling pattern conversion circuit 823.

Figure 9:
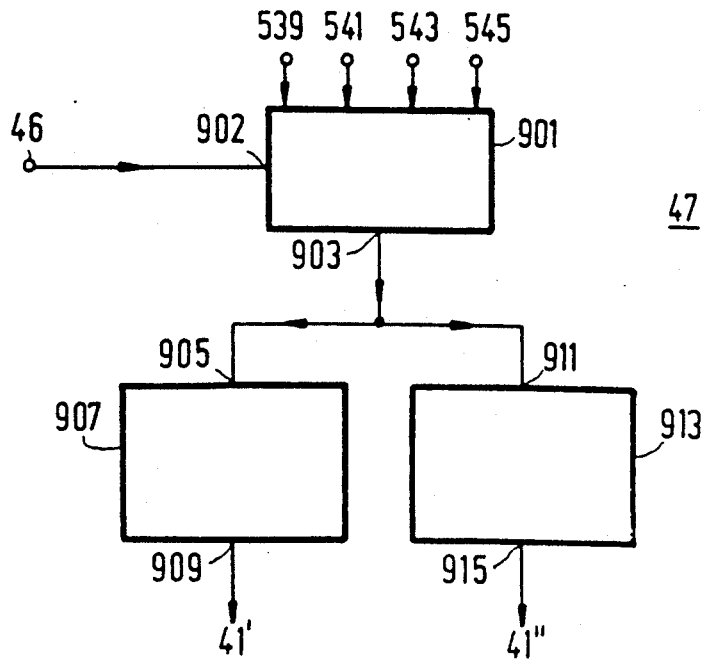
FIG. 9 is a block diagram of a low-resolution postprocessing circuit suitable for the receiving section of FIG. 1B.

FIG. 9 is a block diagram of a low resolution postprocessing circuit 47 suitable for the receiving section according to FIG. 1B. The terminals 539, 541, 543 and 545 are connected to four inputs of a sampling pattern conversion circuit 901. The sampling pattern conversion circuit 901 has an output 903 which is connected to an input 905 of a filter section 907 for calculating an interpolation result of odd samples supplied at an output 909 which is connected to an input 41' of the change-over switch 35 of FIG. 1B. The output 903 of the sampling pattern conversion circuit 901 is also connected to an input 911 of a filter section 913 for calculating an interpolation result of even samples supplied at an output 915 which is connected to an input 41" of the change-over switch 35 of FIG. 1B. The inputs 41' and 41" of the change-over switch 35 of FIG. 1B together constitute its dual input 41.

The control input 46 of the low resolution postprocessing circuit 47 is connected to an input 902 of the sampling pattern conversion circuit 901.

Figure 10:
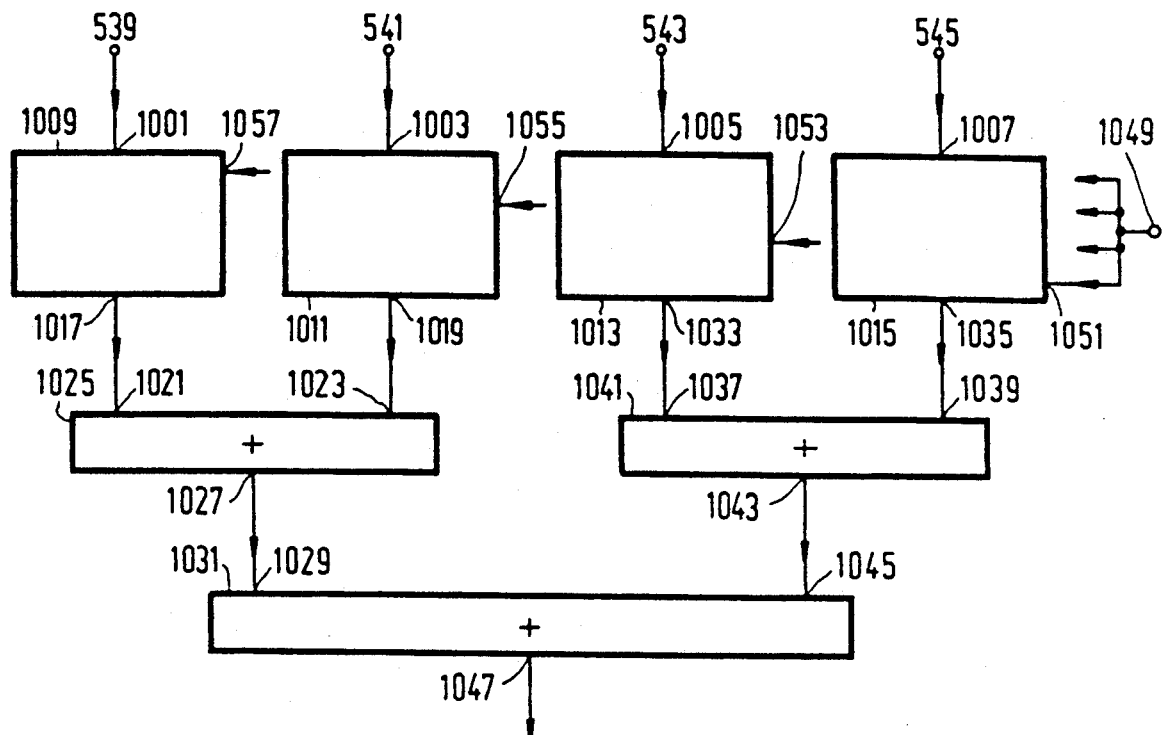
FIG. 10 is a block diagram of a sampling pattern conversion circuit suitable for the postprocessing circuits of FIG. 7, 8 or 9.

FIG. 10 is a block diagram of a sampling pattern conversion circuit suitable for use in a postprocessing circuit according to FIGS. 7 (701, 703, 705 or 707), 8 (821 or 823) or 9 (901). The terminals 539, 541, 543 and 545 are connected to inputs 1001, 1003, 1005 and 1007 of filter sections 1009, 1011, 1013 and 1015, respectively. Outputs 1017 and 1019 of the filter sections 1009 and 1011 are connected to inputs 1021 and 1023, respectively, of a first adder 1025, an output 1027 of which is connected to a first input 1029 of a second adder 1031. Outputs 1033 and 1035 of the filter sections 1013 and 1015 are connected to inputs 1037 and 1039, respectively, of a third adder 1041, an output 1043 of which is connected to a second input 1045 of the second adder 1031. An output 1047 of the second adder 1031 supplies the conversion result. A control input 1049 of the sampling pattern conversion circuit is connected to a control input 1051 of the filter section 1015, to a control input 1053 of the filter section 1013, to a control input 1055 of the filter section 1011 and to a control input 1057 of the filter section 1009.

Generally, not all filter sections 1009 to 1015 are simultaneously active. Which of these filter sections is active depends on the input sampling pattern which is presented to the terminals 539 to 545. If this input sampling pattern is the high resolution sampling pattern, all four filter sections 1009 to 1015 may be active. If the input sampling pattern is an medium resolution sampling pattern, the first two filter sections 1009 and 1011 will be active during the first picture of every two pictures and the last two filter sections 1013 and 1015 will be active during the second picture of every two pictures. If the input sampling pattern is a low resolution sampling pattern, only one of the four filter sections 1009 to 1015 will be active during each field: the filter section 1009 during the first field of four successive fields, the filter section 1011 during the second field, the filter section 1013 during the third field and finally the filter section 1015 during the fourth field.

Figure 11:
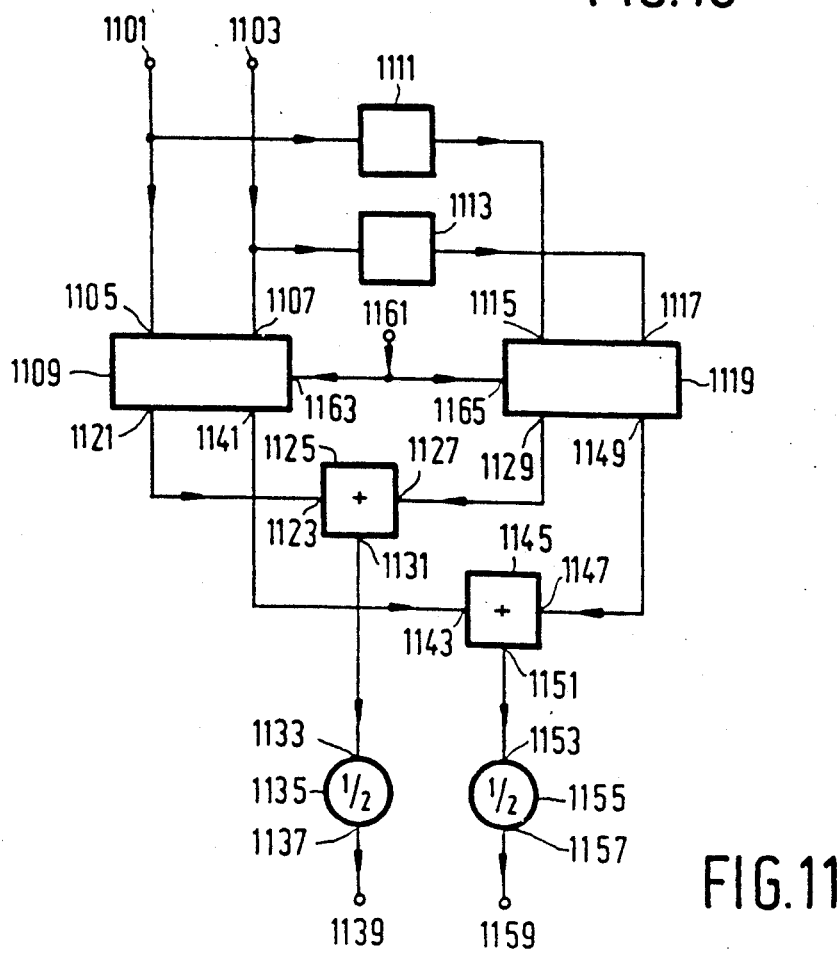
FIG. 11 is a block diagram of a motion-compensated interpolation circuit suitable for use with the high-resolution postprocessing circuit of FIG. 7 or with the medium-resolution postprocessing circuit of FIG. 8, FIGS. 12A, 12B and 12C are block diagrams of a switchable delay member suitable for the motion-compensated interpolation circuit of FIG. 11.

FIG. 11 is a block diagram of a motion-compensated interpolation circuit suitable for use with the high resolution postprocessing circuit 43 of FIG. 7 or with the medium resolution postprocessing circuit 45 of FIG. 8. With reference to FIG. 1B these motion-compensated interpolation circuits may e.g. be arranged between the output of the high resolution postprocessing circuit 43 or the medium resolution postprocessing circuit 45 and the inputs 37 or 39, respectively, of the change-over switch 35. The odd and even samples are presented to input terminals 1101 and 1103, respectively, which may be connected to the outputs 803 and 805, respectively, of the high resolution postprocessing circuit 43 (FIG. 7) or to the outputs 855 and 867, respectively, of the medium resolution postprocessing circuit 45 (FIG. 8). The input terminals 1101 and 1103 are connected to inputs 1105 and 1107, respectively, of a switchable delay member 1109 and to inputs 1115 and 1117 of a switchable delay member 1119 via memories 1111 and 1113, respectively. If the motion-compensated interpolation circuit is arranged in series with the high resolution postprocessing circuit 43, the memories 1111 and 1113 provide for a delay of two picture periods, and if the motion-compensated interpolation circuit is arranged in series with the medium-resolution postprocessing circuit 45, the memories 1111 and 1113 provide for a delay of one picture period. An output 1121 for odd samples of the switchable delay member 1109 is connected to a first input 1123 of an adder 1125 a second input 1127 of which is connected to an output 1129 for odd samples of the switchable delay member 1119. An output 1131 of the adder 1125, is connected to an input 1133 of a halving circuit 1135, an output 1137 of which is connected to an output terminal 1139 for odd samples of the motion-compensated interpolation circuit. An output 1141 for even samples of the switchable delay member 1109 is connected to a first input 1143 of an adder 1145, a second input 1147 of which is connected to an output 1149 for even samples of the switchable delay member 1119. An output 1151 of the adder 1145 is connected to an input 1153 of a halving circuit 1155, an output 1157 of which is connected to an output terminal 1159 for even samples of the motion-compensated interpolation circuit. A control input 1161 of the motion-compensated interpolation circuit which is connected to the output 31 of the DATV decoding circuit 29 of FIG. 1B and to which the motion vectors decoded by the DATV decoding circuit 29 are applied, is connected to a control input 1163 of the switchable delay member 1109 and to a control input 1165 of the switchable delay member 1119.

The motion-compensated interpolation circuit of FIG. 11 operates as follows. A block of pixels from the current picture is applied to the inputs 1105 and 1107 of the switchable delay member 1109. The switchable delay member 1109 shifts this block over one quarter, half or three quarters of a motion vector into the direction of the motion vector which is transmitted along with the DATV signal by the transmitting section. The switchable delay members 1109 and 1119 are to this end controlled by the output signal at the output 31 of the DATV decoding circuit 29 of FIG. 1B. A block of pixels from the previously transmitted picture is applied to the inputs 1115 and 1117 of the switchable delay member 1119. This switchable delay member 1119 shifts this block forward over three quarters, half or one quarter of a motion vector in the direction of the motion vector. The blocks are shifted per quarters of motion vectors if a video signal with a high spatial resolution must be displayed in the case of considerable and uniform motion. The blocks are shifted over half the motion vectors, if a video signal with an intermediate spatial resolution must be displayed in the case of considerable and uniform motion, or if a video signal with a high spatial resolution must be displayed in the case of little and uniform motion. The shifted blocks from the current picture and from the previously transmitted picture are averaged by the adders 1125, 1145 and the halving circuits 1135, 1155.

Figure 12:
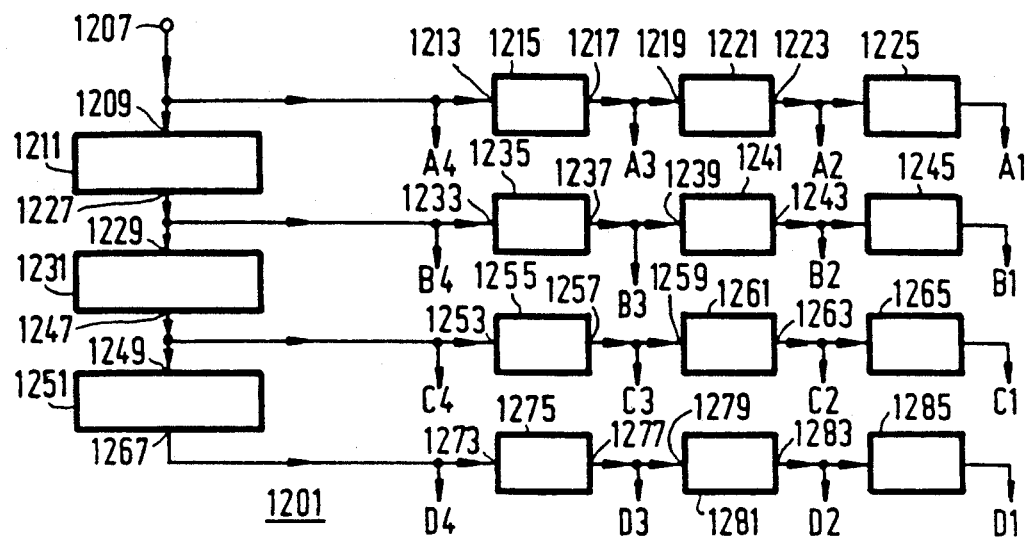
Figure 12:
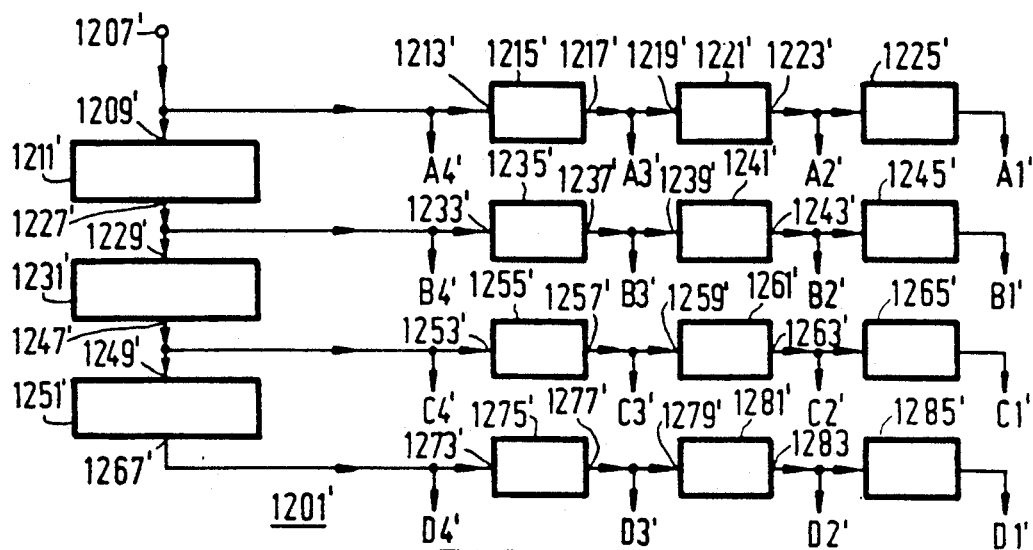
Figure 12:
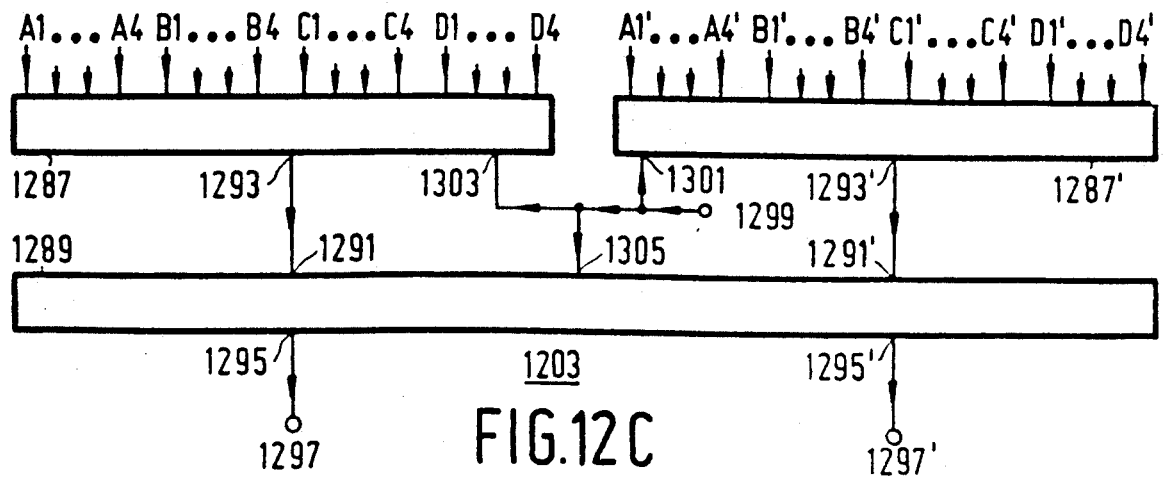

FIGS. 12A, 12B and 12C show block diagrams of a switchable delay member suitable for the motion-compensated interpolation circuit of FIG. 11. FIG. 12A is a block diagram of a delay member for odd samples 1201, having sixteen terminals A1 to A4, B1 to B4, C1 to C4, D1 to D4 for connection to a switching member 1203 which is shown in a block diagram in FIG. 12C. FIG. 12B is a block diagram of a delay member for even samples 1201' having sixteen terminals A1' to A4', B1' to B4', C1' to C4', D1' to D4' for connection to the switching member 1203. The switching member 1203 supplies with reference to a motion vector applied to a control input 1299 thereof a video signal which has undergone a delay corresponding to this motion vector.

In FIG. 12A an input terminal 1207 of the delay member for odd samples 1201 is connected to an input 1209 of a line memory 1211, to the terminal A4 and to an input 1213 of a pixel memory 1215. An output 1217 of the pixel memory 1215 is connected to the terminal A3 and to an input 1219 of a pixel memory 1221. An output 1223 of the pixel memory 1221 is connected to the terminal A2 and via a pixel memory 1225 to the terminal A1. An output 1227 of the line memory 1211 is connected to an input 1229 of a line memory 1231, to the terminal B4 and to an input 1233 of a pixel memory 1235. An output 1237 of the pixel memory 1235 is connected to the terminal B3 and to an input 1239 of a pixel memory 1241. An output 1243 of the pixel memory 1241 is connected to the terminal B2 and via a pixel memory 1245 to the terminal B1. An output 1247 of the line memory 1231 is connected to an input 1249 of a line memory 1251, to the terminal C4 and to an input 1253 of a pixel memory 1255. An output 1257 of the pixel memory 1255 is connected to the terminal C3 and to an input 1259 of a pixel memory 1261. An output 1263 of the pixel memory 1261 is connected to the terminal C2 and via a pixel memory 1265 to the terminal C1. An output 1267 of the line memory 1251 is connected to the terminal D4 and to an input 1273 of a pixel memory 1275. An output 1277 of the pixel memory 1275 is connected to the terminal D3 and to an input 1279 of a pixel memory 1281. An output 1283 of the pixel memory 1281 is connected to the terminal D2 and via a pixel memory 1285 to the terminal D1.

A description of the delay member for even samples 1201' in FIG. 12B can be obtained by the addition of a prime (') to all reference symbols in the above-mentioned description of the delay member for odd samples 1201 in FIG. 12A.

The switching member 1203 shown in FIG. 12C comprises a first switch 1287 with the sixteen terminals A1 to D4, a second switch 1287' with the sixteen terminals A1' to D4' and a third switch 1289 having a first input 1291 which is connected to an output 1293 of the first switch 1287 and a second input 1291' which is connected to an output 1293' of the second switch 1287'. The third switch 1289 has a first output 1295 which is connected to an output terminal for odd samples 1297 of the switchable delay member and a second output 1295' which is connected to an output terminal for odd samples 1297' of the switchable delay member. The control input 1299 of the switching member 1203 is connected to a control input 1301 of the second switch 1287', to a control input 1303 of the first switch 1287 and to a control input 1305 of the third switch 1289.

With the aid of this switchable delay member eight pixels can be reached on a field basis in four lines so that a range of at most +3 to −3 is achieved on a picture basis.

Figure 13:
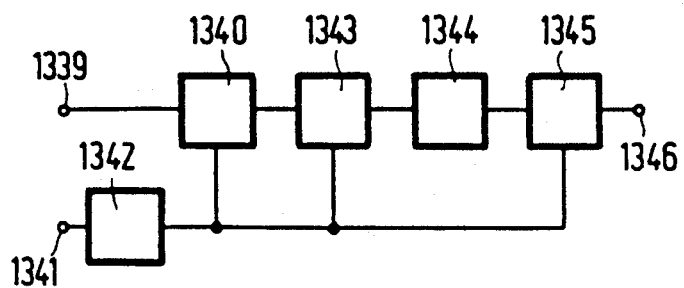
FIG. 13 is a block diagram of an alternative embodiment of a television receiving apparatus according to the invention.

FIG. 13 is a block diagram of part of an alternative embodiment of a receiving equipment for receiving a 625 lines, 50 fields per second, 2:1 interlaced video signal which has been processed on the transmission side in the manner described hereinbefore. This figure does not disclose the normal "front-end" processing on the received signal, namely frequency selection, frequency changing and demodulation of the received signal as these are processes which are in themselves well known and not essential for an understanding of the present invention. In addition the separation of the various components of the MAC signal are also shown as again this is also not essential for the present understanding. The resulting vision (luminance) signal is applied via a terminal 1339 to an inverse shuffler 1340 in which the transmitted samples are restored to their correct positions which they occupied prior to shuffling in the transmission equipment on a block-by-block basis. The nature of the inverse shuffling is controlled from a digital assistance signal (DATV) present at a terminal 1341 after demodulation from the received MAC signal in the earlier part of the receiver, the DATV signal being applied to a channel decoder 1342 in which the DATV signal is decoded to provide the appropriate control signals to the inverse shuffler 1340 and other units yet to be described. The inverse shuffler produces a 1250 lines, 50 fields per second, 2:1 interlaced signal of coarse structure which is applied to a unit 1343 providing adaptive switched interpolation filtering, the spatial frequency filtering characteristics being controlled on a block-by-block basis by the control signal from the decoder 1343. The spatial frequency filter characteristics in unit 1342 approximates the spatial frequency characteristic of the filters employed in the transmission equipment for the branches or sub-branches. The filters so applied are normalised from pixel to pixel and all filter coefficients are arranged to be positive. The unit 1343 produces a roughly interpolated picture where additional pixels are generated for those pixel points for which a sampled pixel has not been received though the sampled pixels are not changed.

The resulting output of the switched filter unit 1343 is applied to a sub-sampler 1344 in which the previously interpolated signal is again sub-sampled with the manner of sub-sampling being the same as that as in the transmission equipment for that block. This sub-sampling structure is extended into adjacent blocks to present the following non-adaptive switched interpolation filtering unit 1345 with a uniform sub-sampling structure around each block. A particular block might be re-sub-sampled with several structures corresponding to those used for itself and its neighbours at the transmitter. The adaptive switched interpolation filter unit 1343 and the sub-sampler 1344 form together an alternative embodiment of a sampling pattern conversion circuit suitable in a postprocessing circuit according to FIGS. 7 (701, 703, 705 or 707), 8 (821 or 823) or 9 (901). The spatial frequency filter characteristics in filtering unit 1345 substantially correspond to the spatial frequency characteristics of the filters employed in the transmission equipment for the branches or sub-branches, these characteristics being switched under the control of the signals from the decoder 1342. The fully interpolated 1250 lines signal from the filtering unit 1345 is applied to an output terminal 1346 for producing a high definition display.

Figure 14:
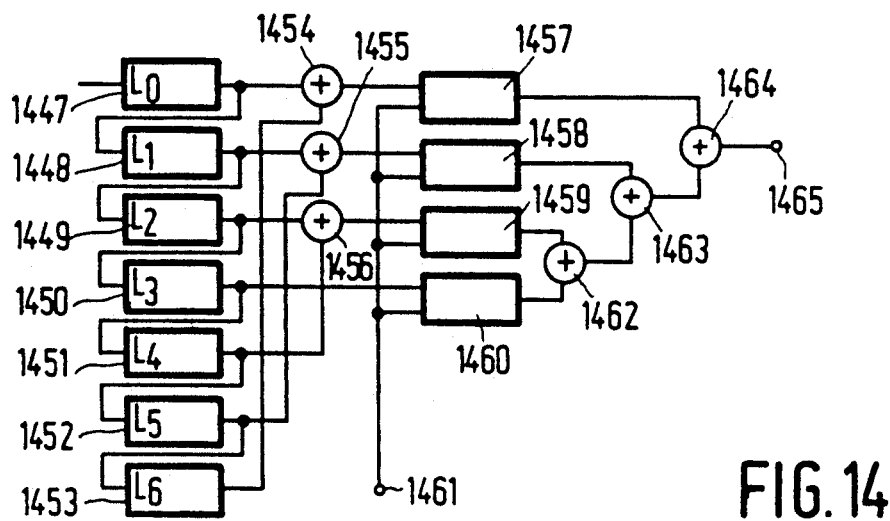
FIGS. 14 and 15 are diagrams of a filter arrangement for use with the apparatus of FIG. 13, FIGS. 16a and 16b are diagrams for explaining the operation of part of the apparatus of FIG. 13.

The adaptive switched interpolation filter unit 1343 of FIG. 13 may comprise a number of switched filters depending on the number of branches or sub-branches in the transmission equipment. For a transmission equipment comprising e.g. seven sub-branches, as described in U.S. Pat. No. 4,965,667 which is incorporated herein by way of reference, seven switched filters will be required with positive coefficients with dynamically adjustable gains. A construction for such a switched filter is shown in FIG. 14 which comprises seven sequentially connected line period stores indicated by the reference 1447 through to 1453 arranged to receive and deliver lines of the television signal from the inverse shuffler 1340 (FIG. 13) on a first-in first-out basis (FIFO). Three adder circuits 1454, 1455 and 1456 each and the outputs of a pair of line stores as shown and the resulting added signals are applied to respective partial filters 1457, 1458 and 1459 while a further partial filter 1460 receives its input direct from line store 1450. A terminal 1461 receives the control signals from the decoder 1342 (FIG. 13) either directly or after further processing and applies these as a coefficient control to the partial filters 1457, 1458, 1459 and 1460. The outputs of partial filters 1459 and 1460 are added in an adder circuit 1462 whose output is added with the output of partial filter 1458 in a further adder circuit 1463. The output of this latter adder circuit is added to the output of partial filter 1457 in an adder circuit 1464 whose output at terminal 1465 is the output of the filter.

Figure 15:
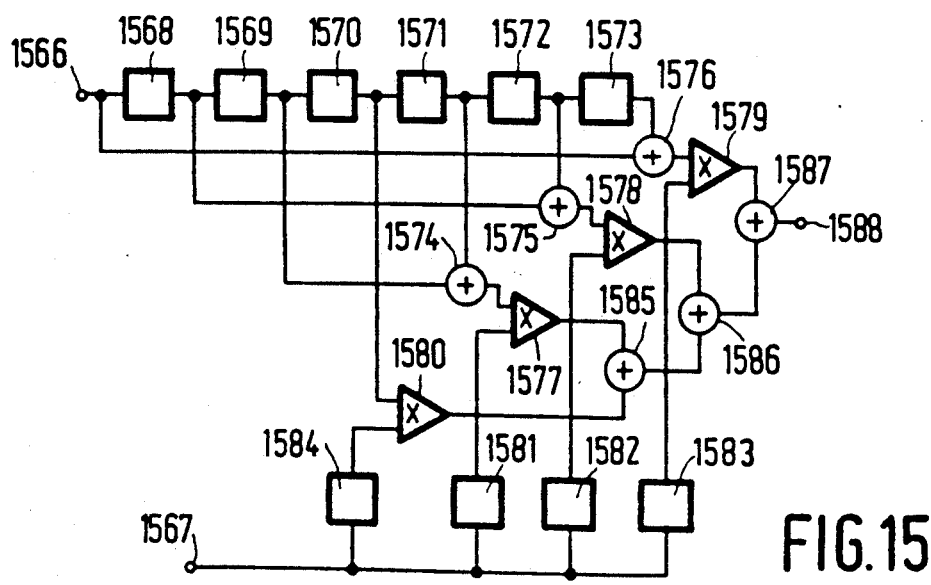

FIG. 15 shows a construction for a partial filter 1457, 1458, 1459 or 1460 of FIG. 14. In FIG. 15 the reference 1566 indicates the reference for the signal input to the filter while 1567 indicates the coefficient control input. Signal input 1566 is connected to sequentially connected delays given the references 1568 through to 1573 each have a delay period corresponding to the interval between pixels. The input 1566 and the outputs from delays 1568, 1569, 1571 to 1573 are connected in pairs in the manner shown to three adder circuits 1574, 1575 and 1576 whose outputs are connected to the first input of respective multipliers 1577, 1578 and 1579 while the first input of a further multiplier 1580 is connected to the output of delay 1570. The second inputs of the multipliers 1577, 1578, 1579 and 1580 is connected to the output of a respective coefficient store 1581, 1582, 1583 and 1584 whose inputs are connected to the coefficient control input 1567. The outputs of multipliers 1577 and 1580 are added in an adder circuit 1585 whose output is added to that from multiplier 1578 in a further adder circuit 1586. The output of adder circuit 1586 is added to the output of multiplier 1579 in an adder circuit 1587 whose output at 1588 forms the output of the partial filter.

The filtering unit of FIG. 13 and the particular filter of FIGS. 14 and 15 provides adaptive gain adjustment by dynamically adjusting the d.c. gain of each filter. Two methods of determining the necessary gain, an a priori method and an a posteriori method, will be described.

Figure 16A:
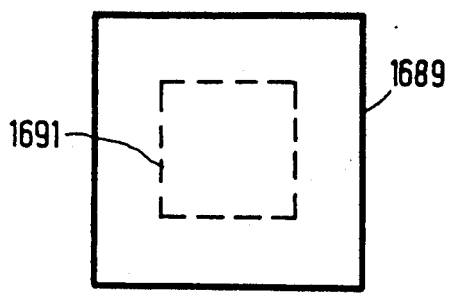
Figure 16B:
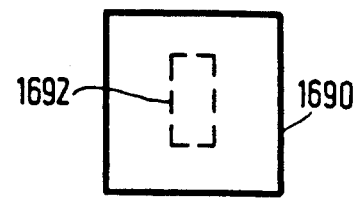
Figure 17:
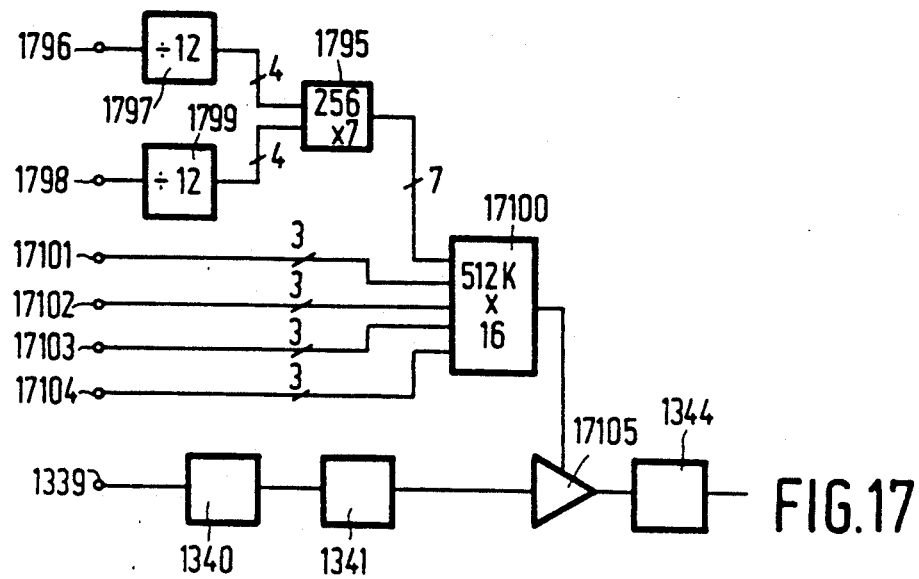
FIG. 17 is a block diagram of part of the apparatus of FIG. 13.

The a priori method for renormalisation uses information available before interpolation, namely the branch or sub-branch selection for the current and adjacent blocks and the position of the current pixel within its block. The structures of two blocks are shown in FIGS. 16a and 16b where FIG. 16a respresents a block 1689 which is 12 pixels wide by 12 lines while FIG. 16b represents a block 1690 which is 8 pixels by 8 lines high. These two figures show a central area 1691, 1692 surrounded by the long linked lines for which the gain is independent of the surrounding blocks since the range of the interpolation filter falls entirely within the block. Removing the central area 1691 a $12 \times 12$ block has potentially $144 - 36 + 1 = 109$ positions with unique gains which may be represented within a 7 bit code, so an initial mapping may be achieved with a $256 \times 7$ bit memory 1795 as shown in FIG. 17. This memory is driven from a pixel clock input 1796 via a divide-by-12 divider 1797 which provides a 4-bit horizontal position input and from a line clock input 1798 via a further divide-by-12 divider 1799 which provides a 4-bit vertical position input. The gains are also affected by the sub-branches used in neighbouring blocks and it is quite simple to isolate the nearest selection horizontally, vertically and diagonally using shift registers. To described these $3 \times 4 = 12$ bits are required, together with the selection for the current sub-branch, in a system as described with a total of seven channels. When combined with the 7 bits describing the position within the block this gives a total of 19 bits. This corresponds with the 512K words of memory 17100 also present in FIG. 17 to select the gain of the filter. The inputs to memory 17100 are the 7 bits from memory 95, 3 bits at a terminal 17101 representing the current block, 3 bits at a terminal 17102 representing the vertical neighbouring block, 3 bits at a terminal 17103 representing the horizontal neighbouring block and 3 bits at a terminal 17104 representing the diagonal neighbouring block.

With a three branch system as shown in FIG. 1 considerably less memory is required and the range of the filters is smaller since the very high resolution sub-branches are not present. If no optimisation is performed then 6 bits would be required to describe the position within the block and $4 \times 2 = 8$ bits to describe the block selection which gives a total of 14 bits and 16K words of memory.

Having determined what the gain should be this can either be achieved by scaling the coefficients before multiplication (see the partial filter of FIG. 15 or using switched coefficients and following the filter unit 1343 by a single multiplier 17105 to alter the overall gain as shown in FIG. 17, the control input for multiplier 17105 being provided by the memory 17100. Although with the latter arrangement care needs to be taken to ensure that any rounding errors within the filter unit 1343 are not magnified subsequently, it does require considerably less memory than controlling the gain of the nine multipliers in the partial filter of FIG. 15.

From the above it will be appreciated that while the a priori method may be acceptable for the three branch system of FIG. 1, it becomes progressively less attractive as sub-branches are added since the number of alternatives rises with the fourth power of the number of bits required to select a sub-branch, this being in addition to any increase in the block size to reduce the amount of DATV data and hence its rate.

Figure 18:
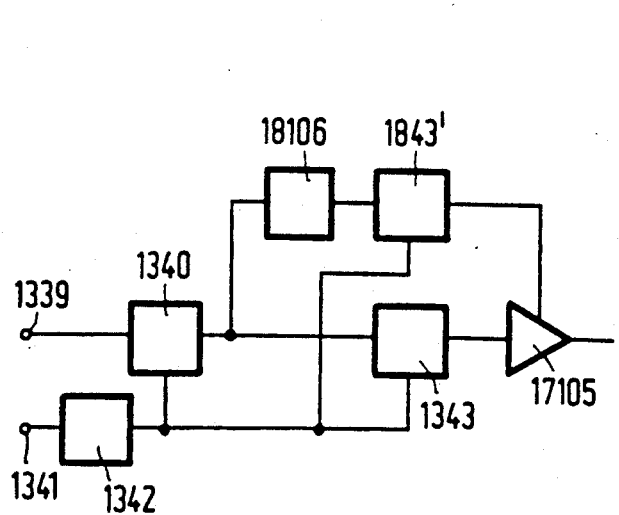
FIG. 18 is a block diagram of an alternative arrangement to that shown in FIG. 17.

The a posteriori gain control method for renormalisation uses two switch filters 1343 and 1843', in parallel as shown in FIG. 18, the filter 1343 performing the filtering operation while the other filter 1843' calculates the renormalisation factor. If the conventional range of 16 to 235 is used to represent the video levels from black to white, and zeros are inserted in missing pixel positions during the inverse shuffle, then it is reasonable to assume that only non-zero values represent transmitted values. The second filter 1843' takes a 1 bit signal from a detector 18106 which detects when the output from the inverse shuffler 1340 is greater than 0 and which indicates whether a particular sample has been transmitted, as its input and its output will be the sum of the coefficients that corresponded with active samples. This total is inverted and used to control the gain of the multiplier 18105 following the first filter 1343.

The hardware for the second filter is reasonably simple since, having folded the filter the coefficients will only be multiplied by 0, 1, 2, 3 or 4, so only small memories are necessary to hold these options for each sub-branch; 2+3 bits are required for a seven channel system, giving a total of 32 words per coefficient. The attractions of this method are twofold. First, the hardware complexity is only determined by the number of coefficients within the first stage interpolation filter 1343. Several additional sub-sampling structures are described in copending patent application Ser. No. 281,294, filed Dec. 7, 1988 U.S. Pat. No. 4,965,667 and incorporated by reference herein which could increase the total number of sub-branches to twelve, without requiring any more coefficients. The only minor increase in hardware is that one additional bit would be necessary to switch the coefficients between the sub-sampling patterns, increasing the total size for each coefficient from 32 words to 64 words. The same change with the a priori system would add four bits, and would increase the memory from 512K words to 8M words. The block size used has no influence on the hardware for the a posteriori renormalisation method. Clearly there is a break-even point at which the additional overhead of the posteriori system is outweighed by this large memory requirement. A second advantage of the a posteriori method is that it is possible to change the sub-sampling patterns for one channel without any effect on the others, since the filter will adapt automatically to the samples available.

Figure 19:
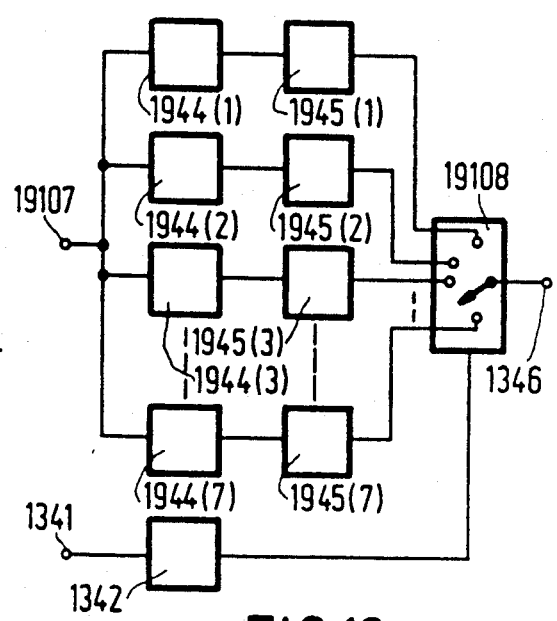
FIG. 19 is a block diagram of a further part of the apparatus of FIG. 13.

The second stage of interpolation comprises, as described in relation to FIG. 13, a sub-sampler 1344 and a non-adaptive switched interpolation filter unit 1345. A parallel implementation of such an arrangement is shown in FIG. 19 where a terminal 19107 corresponds to the output of the first interpolator stage, namely filter unit 1343. This output is applied to the inputs of seven sub-samplers 1944(1) to 1944(7) though in FIG. 19 only four of these are shown so as to simplify the figure. The output of each sub-sampler 1944 is applied to an associated non-adaptive filter 1945(1) to 1945(7) though again only four such filters are actually shown. The seven filters 1945 each have a differing spatial frequency response which substantially corresponds to one of the spatial frequency responses in the transmission equipment prior to decimation so that all seven such responses are present in this second stage though renormalised to take their sub-sampling patterns into account. The sub-sampling ensures that the estimates calculated by the first stage of the interpolation (1343), are only used where necessary. The outputs of the seven filters 1945(1) to 1945(7) are connected to respective inputs of a selector switch 19108 the control input of which is actuated by the DATV signal from the channel decoder 1342. The output of the selector switch 19108 provides the high definition output at the output terminal 1346.

Although in the above description the receiving apparatus has been described in relation to the reception and processing of high definition television signals such apparatus, suitably modified, may be used to process any signal representing a two dimensional image. Such a signal may be transmitted over a conventional or modified transmission channel or stored on a record carrier.

In summary, the invention has been described in relation to a television signal of the MAC-packet type which has been adapted for high definition television (HDTV) where although the signal source may provide a 1250 lines, 50 Hz field rate, 2:1 interlaced signal, the signal actually transmitted will have 625 lines, 50 Hz field rate, 2:1 interlaced so that it can be received by non-HDTV receivers. The transmitted vision signal will be accompanied by a digital signal giving additional information as to the vision signal and such a system is sometimes referred to by the term Digital Assisted Television (DATV). In the following description it will be assumed that each picture is divided into a number of blocks each a given number of pixels wide by a given number of lines high, which numbers need not correspond, and that the digital information relates to a character or characteristics of each block such as movement and its rate.

With such a transmission system where the signal is derived from a 1250 lines 25 MHz high definition television camera and where the transmission channel is 625 lines, 6 MHz bandwidth, an overall compression of 4:1 is required. The system used to sample the high definition signal ready for transmission makes a compromise between discarding temporal and spatial resolution as shown in the following examples:

| System Period | Temporal Compression | Spatial Compression |
|---|---|---|
| 80 ms | 4:1 | 1:1 |
| 40 ms | 2:1 | 2:1 |
| 20 ms | 1:1 | 4:1 |

Thus several different field rates are used for different velocity ranges as follows:
  i. In a stationary mode (velocity range e.g.: 0–0.5 pixels/40 ms) the field rate is 12.5 Hz and the basic interval is 80 ms.
  ii. In a slowly moving mode (velocity range e.g.: 0.5–2 pixels/40 ms) the field rate is 25 Hz and the basic interval is 40 ms.
  iii. In a moving mode (velocity range e.g.: above 2.0 pixels/40 ms) the field rate is 50 Hz and the basic interval is 20 ms.

Figure 20:
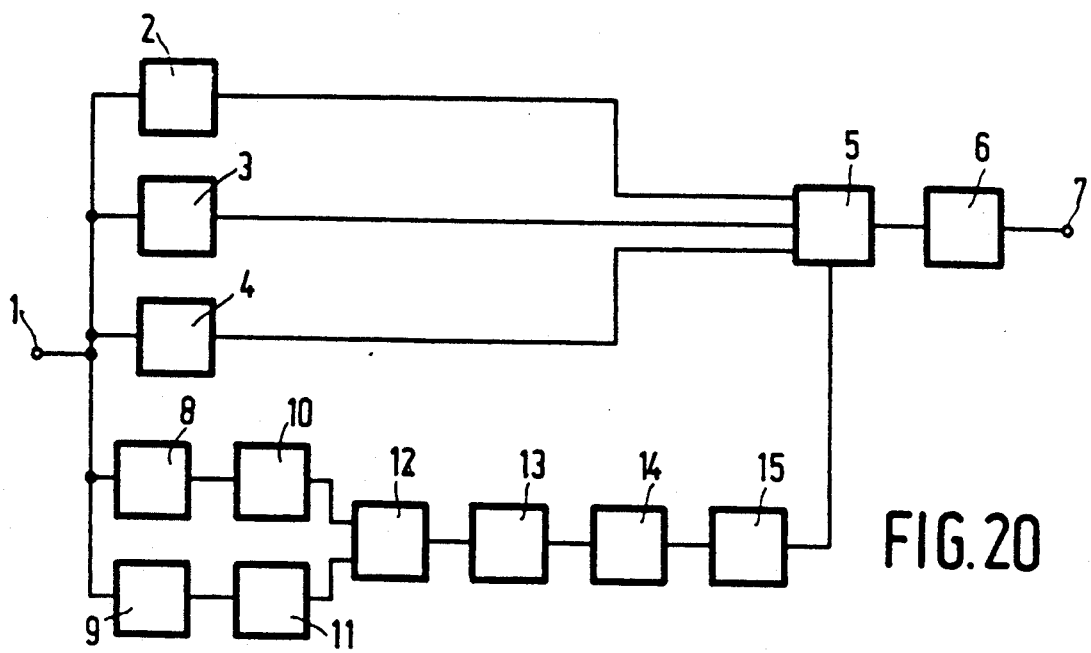
FIG. 20 is a block diagram of another television signal generating equipment according to the invention, and FIGS. 21a, 21b, 21c, 22a, 22b, 22c, 23a, 23b, 23c and 23c' are diagrams for explaining the operation of the equipment of FIG. 20.

FIG. 20 is a block diagram of transmission another equipment for use with such a system where reference 1 indicates an input terminal which receives at least the luminance information from a high definition television camera. This luminance information is applied to three parallel branches 2, 3 and 4 which are respectively the 20 ms, 40 ms and 80 ms branches in which the signal will be processed in a manner to be described. The outputs from these three branches are applied to a branch switch 5 the output of which is derived from one of the branches and is applied by way of a nyquist filter 6 to an output terminal 7 for multiplexing with the other components of the MAC signal prior to its application to a transmission channel or record carrier, the further processing involved not being shown. FIG. 20 also does not show the generation of the digital signal for DATV which conveys in the transmission information such as the nature of the sampling, movement, etc.

The luminance information at input terminal 1 is also applied to first and second transient adaptive motion detectors 8 and 9 the first such detector (8) producing an output where the motion detected is less than 0.5 pixels/40 ms while the second such detector (9) produces an output when the motion detected is greater than 2 pixels/40 ms. The outputs of the motion detectors 8 and 9 are applied to respective first and second spatial consistency circuits 10 and 11 which determine consistency between adjacent and surrounding blocks and whose outputs are applied to a three level decision circuit 12 to produce an output corresponding to one of the three conditions (i) to (iii) as described above. This output is applied to a first temporal consistency circuit 13, which controls the time at which any change in signal level from the decision circuit 12 is passed on depending on the degree of movement, via a further spatial consistency circuit 14 which determines consistency between a block and its surrounding blocks and a second temporal consistency circuit 15, which ensures temporal consistency over a relatively long period (240 ms) to avoid switching artefacts, to the control input of the branch switch 5 to control the selection of the processed signal according to the above criteria.

Figures 21A, 21B, 21C:
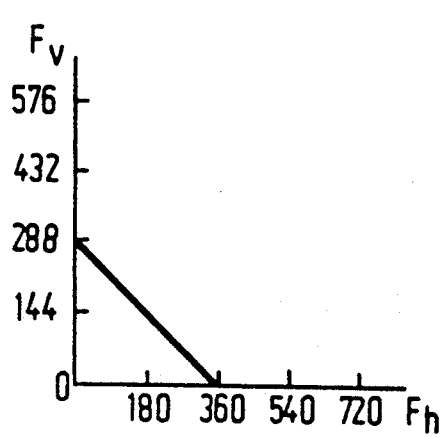

In one form the 20 ms branch 2 may consist of a two-dimensional low-pass filter, a sub-sampling unit and a shuffling unit. The frequency response of the low-pass filter has a diamond-like form, one quadrant of which is shown in FIG. 21a. This filter is an intrafield filter, and has an ideal cut-off frequency point at fs/4 (where fs denotes the high definition sampling frequency). In FIG. 21a Fv is given in cycles per picture height while Fh is given in cycles per picture width. The sub-sampling structure is shown in FIG. 21b while the shuffling of the sampled pixels to be transmitted is shown in FIG. 21c. In these two figures the numbers represent pixels where the first index indicates the number of the field while the second index indicates the line number.

Figures 22A, 22B, 22C:
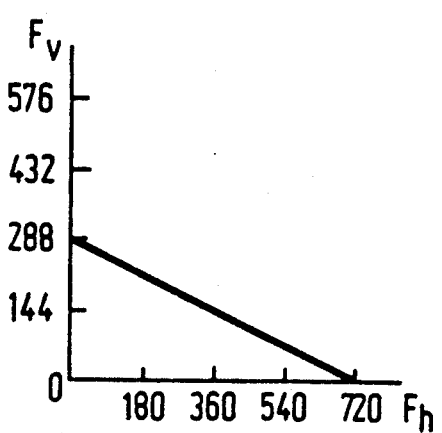

The 40 ms branch 3 may consist of a switch, a two-dimensional low-pass filter, a sub-sampling unit, and a shuffling unit. The switch selects one field out of each pair of interlaced fields and thus can be used for the slowly moving mode. The frequency response to the low-pass filter for this branch also has a diamond-like form one quadrant of which is shown in FIG. 22a. The filter is again an intrafield filter, and has an ideal cut-off frequency point at fs/2. The sub-sampling structure is shown in FIG. 22b and the shuffling of pixels to be transmitted is shown in FIG. 22c (in fact no additional shuffling is required and thus the shuffling unit will also not be required).

Figures 23A, 23B, 23C:
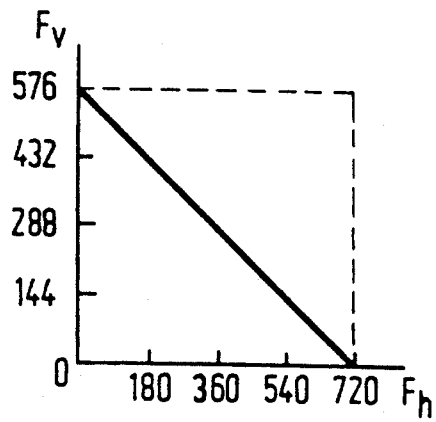

The 80 ms branch 4 consists of a switch, a two-dimensional low-pass filter, a sub-sampling unit and a shuffling unit. The switch selects the first two fields out of four successive fields. These two fields are stored and the two-dimensional filter is applied, the filter having a further diamond-like form one quadrant of which is shown in FIG. 23a as a continuous line, the broken line indicating the frequency response of the source for the HDTV signal. This filter is an intra-frame filter and has an ideal horizontal cut-off frequency point at fs/2. The sub-sampling structure is shown in FIG. 23b while the shuffling of the pixels to be transmitted during a first of two frames is shown in FIG. 23c while those for the second of such frames is shown in FIG. 23c.

For the three branches described so far quincunx sampling structures have been used but it has been found that the sampling patterns are optimised for high horizontal and vertical resolution at the expense of diagonal resolution. Pictures for transmission might contain some spatial structure for which this is not the most appropriate form of sampling and thus it is proposed to provide a number of selective sub-branches, at least for the 20 ms and 40 ms branches 2 and 3, each providing a different sub-sampling structure which can support different spatial frequencies with the transmission equipment selecting the pattern that best represents the frequencies in an area (block) of the picture.

On reading the present description, those skilled in the art will have numerous modifications in mind; all these modifications are considered to be within the scope of the invention.

We claim:

1. A method of transmitting or recording a television signal by way of a channel, said method comprising the steps of:
    a) creating a television signal which comprises a video signal having a plurality of fields presented at a field rate;
    b) selecting one of a plurality of operations for processing said video signal, said operations each comprising at least one mutually different distribution of qualities of resolution, said qualities comprising spatial and temporal resolution; and
    c) controlling the consistency of an operation selected for a first part of an image provided by said video signal as compared to operations selected for neighboring parts of said image.

2. The method of claim 1 wherein said consistency controlling step comprises the further step of:
    selecting a route from a plurality of possible routes each comprising an operation, for a time sequence of a plurality of parts of said image presented in said fields.

3. The method of claim 2 wherein said consistency controlling step comprises the further step of:
    controlling the consistency between said selected routes.

4. The method of claim 2 wherein said consistency controlling step comprises the further step of:
    controlling the consistency between routes selected for spatially neighboring parts of said image.

5. The method of claim 1 wherein a first operation provides high temporal resolution.

6. The method of claim 1 wherein said selecting step comprises the further step of:
    arranging motion present in said video signal into a number of classes, said number being equal to the number of operations.

7. The method of claim 6 wherein said selecting step comprises the further steps of:
    a) measuring the magnitude of said motion;
    b) comparing said magnitude to first and second thresholds;
    c) providing a first signal if said magnitude is larger than said first threshold;
    d) providing a second signal if said magnitude is larger than said second threshold; and
    e) arranging said magnitude in a plurality of classes on the basis of said first and second signals.

8. The method of claim 1 wherein a first operation of said operations provides medium resolution and further comprises the step of determining a plurality of motion vectors for a plurality of displaced fields.

9. The method of claim 8 wherein a second operation provides high resolution and further comprises the step of determining a plurality of motion vectors for said plurality of displaced fields.

10. An apparatus for processing a video signal which is part of a television signal and which comprises an image presented as a plurality of fields, said apparatus comprising:
a) a video signal input;
b) means for selecting one of a plurality of video signal processing paths each providing an operation, each operation comprising at least one mutually different distribution of qualities of resolution, said qualities comprising spatial and temporal resolution; and
c) means for controlling the consistency of a selected path for a first part of an image provided by said video signal as compared to paths selected for neighboring parts of said image.

11. The apparatus of claim 10, wherein said controlling means further comprises means for selecting a route from a plurality of possible routes each comprising an operation, for a time sequence of a plurality of parts of said image presented in said fields.

12. The apparatus as claimed in claim 11, wherein said controlling means further comprises a route consistency control member for controlling the consistency between said selected routes.

13. An apparatus as claimed in claim 12, wherein said route consistency control member controls the consistency between routes selected for spatially neighboring parts of said image.

14. An apparatus as claimed in claim 10, wherein one of said paths provides high temporal resolution and said apparatus further comprises means for avoiding the selection of said first path when said television signal is created from a film source.

15. An apparatus for receiving a television signal comprising a video signal provided by a channel, said apparatus comprising:
means for processing said video signal in accordance with a plurality of operations, each operation comprising at least one mutually different distribution of qualities of resolution, said qualities comprising spatial and temporal resolution, each operation responding to one of a plurality of sampling patterns; and
means for performing a first operation which converts a first sampling pattern of a block of pixels provided by said video signal to a second sampling pattern.

16. The apparatus of claim 15, wherein one of said operations provides medium spatial resolution and further comprises means for providing motion compensated interpolation.

17. The apparatus as claimed in claim 16, wherein one of said operations provides high spatial resolution and further comprises means for providing motion compensated interpolation.

18. The apparatus as claimed in claim 16, wherein said motion compensated interpolation means further comprises switchable delay means and averaging means.

19. The apparatus as claimed in claim 17, wherein said motion compensated interpolation means further comprises switchable delay means and averaging means.

* * * * *